United States Patent [19]
Takaragi et al.

[11] Patent Number: 6,122,375
[45] Date of Patent: Sep. 19, 2000

[54] HASH VALUE GENERATING METHOD AND DEVICE, DATA ENCRYPTION METHOD AND DEVICE, DATA DECRYPTION METHOD AND DEVICE

[75] Inventors: Kazuo Takaragi, Ebina; Hiroyuki Kurumatani, Yokohama, both of Japan

[73] Assignee: Hitachi, Ltd., Tokyo, Japan

[21] Appl. No.: 09/090,417

[22] Filed: Jun. 4, 1998

Related U.S. Application Data

[63] Continuation-in-part of application No. 08/986,390, Dec. 8, 1997.

[30] Foreign Application Priority Data

Dec. 10, 1996 [JP] Japan ................................. 8-329741
Jun. 6, 1997 [JP] Japan ................................. 9-149423

[51] Int. Cl.[7] ......................... H04L 9/28; H04L 9/06; H04L 9/18
[52] U.S. Cl. ................... 380/28; 380/37; 380/42
[58] Field of Search ................... 380/28, 37, 42, 380/268, 269; 708/203, 208, 209, 503; 713/100, 180

[56] References Cited

U.S. PATENT DOCUMENTS

| | | | |
|---|---|---|---|
| 5,671,284 | 9/1997 | Buer | 380/29 |
| 5,740,251 | 4/1998 | Tajima et al. | 380/49 |
| 5,751,810 | 5/1998 | Miyaji et al. | 380/28 |
| 5,835,600 | 11/1998 | Rivest | 380/44 |

OTHER PUBLICATIONS

ISO/IEC 10118–2, "Information Technology–Security Techniques–Hah–Functions: Part 2: Hash–Functions using an n–bit Block cipher Algorithm" (1994), pp. 1–7.

R. Rivest, "The MD5 Message–Digest Algorithm," IETF RFC 1321 (1992) pp. 1–19.

*Primary Examiner*—Tod R. Swann
*Assistant Examiner*—Justin T. Darrow
*Attorney, Agent, or Firm*—Antonelli, Terry, Stout & Kraus, LLP

[57] ABSTRACT

Hash values, keys and cipher text which have a high degree of data scrambling are generated rapidly. When a message is sent, divisional data of the message are input, and injection extension processing is performed so that the data length of output data is longer than the data length of input data. Further, hash values are generated by a hash function containing multiplication processing, cyclic shift processing, etc.

14 Claims, 27 Drawing Sheets

$g(x, a_1, a_2, a_3, a_4) \equiv a_1 + a_2 \cdot x + a_3 \cdot x^2 + a_4 \cdot x^3 \pmod{n}$

HASH VALUE GENERATING METHOD AND DEVICE, DATA ENCRYPTION METHOD AND DEVICE, DATA DECRYPTION METHOD AND DEVICE

This is a continuation-in-part of application Ser. No. 08/986,390, filed Dec. 8, 1997.

BACKGROUND OF THE INVENTION

The present invention relates to a technique for ensuring security of digital signature, data encryption, etc. in a computer network, and particularly to a method of converting a message to a hash value which is difficult to inversely convert.

A public key cipher system has been known as an encryption system for data such as electronic mail which is sent and received through a network. The processing flow based on the public key cipher system is as follows:

(1) A user beforehand distributes to transmitters a public key for encrypting an electronic mail to be sent to the user.

(2) A transmitter who wishes to send the electronic mail to the user encrypts the electronic mail by using the public key which is distributed from the user who is the intended recipient of the electronic mail, and then transmits the encrypted electronic mail to the destination of the electronic mail.

(3) The user decrypts the encrypted electronic mail by using the user's own secret key (having a numeric value different from the public key) when receiving the encrypted electronic mail which is encrypted by the public key distributed by himself/herself.

This public key cipher system has been applied not only to a data encryption technique, but also to a digital signature technique which is a technique for electrically verifying legitimacy of a contract or the like in electronic commerce using a network.

However, a lot of time is needed if a digital signature for a long message is generated by using only the public key cipher in the digital signature technique. Therefore, there has been proposed a method of temporarily compressing a message to shortened data and then generating a digital signature for the compressed data.

Here, for this type of data compression, it is unnecessary to compress the data so that an original message can be restored from the compressed data unlike normal data compression, however, it is necessary to compress the data so that the compressed data has a kind of encryption characteristic. A hash function has been proposed to implement such compression.

A message for an electronic commerce document or the like, for example, Document A: "To Taro & Co. Esq., I will purchase a car (catalog No. 1443) at one million and forty thousand yen. Mar. 10, 1996 Yoshiura" is input data to the hash function. There is no upper limit to the length of the input data.

The hash function subjects the input data to processing like encryption conversion to compress the input data to data having a fixed short length. For example, hash value: 283AC9081E83D5B28977 is an output of the hash function.

This hash value is called a message digest or a finger print, and ideally substantially only one hash value exists for one input data (message) in the world. In order to guarantee that "substantially only one exists in the world", it is generally recognized that the length of the hash value must be set to at least about 128 bits. More specifically, the hash function must have the following characteristics.

(1) One-way Property

When an output value of a hash function is given, it must be computationally difficult to determine another message which brings the same output value as the above output value.

For example, it is assumed that the birthday of Kazuo is February 22nd. In order to search for another person whose birthday is coincident with Kazuo's birthday, it is statistically sufficient to investigate the birthdays of about 183 (365/2) persons.

The same is satisfied even when the person is replaced by a message and the birth day is replaced by a hash value. That is, if the length of the hash value is set to 160 bits, the hash value can have any one of $2^{160}$ possible values (i.e., the total number of possible hash values is equal to $2^{160}$). In order to search another message having the same hash value as a message concerned, it is required to investigate messages of $2^{160}/2$ (=2159), and this is computationally difficult.

(2) Collision Free Property

The message and the hash value may be any values (i.e., no limitation is imposed on the message and the hash value). At any rate, it must be computationally difficult to find out two different messages which have the same hash value.

For example, when any two persons having the same birthday are required to be found out, the birthdays of about 24 persons (=$365^{1/2}$) need to be investigated in probability.

This is also satisfied even when the person is replaced by the message and the birth day is replaced by the hash value. That is, if the length of the hash value is set to 160 bits, in order to find out two different messages (any messages are possible) having the same hash value, it is necessary to investigate a set of messages of about $2^{160/2}=2^{80}$ on average. This number is smaller that that in the case of the one-way property, but this value is still computationally difficult.

Various methods have been proposed to implement the hash function which requires the above characteristics, and at present a method of repeating character-substitution and transposition to obtain hash values have mainly been used. The following paper 1 discloses the processing principle of the method:

ISO/IEC 10118-2, "Information technology—Security Techniques—Hash-functions: Part 2: Hash-functions using an n-bit block encryption algorithm" (1994)

The hash function as disclosed in the paper 1 will be described with reference to FIG. 27.

The left side of FIG. 27 is a diagram showing the processing flow of a general hash function, and the right side of FIG. 27 is a diagram showing the processing flow when an encryption function such as DES (Data Encryption Standard) is used for character-substitution/transposition repeating processing 3005 shown in the left side of FIG. 27.

As shown at the left side of FIG. 27, a message 3001 to be compressed is divided into a first section $P_1$3002, a second section $P_2$3003, . . . , for every predetermined length, and these sections are successively input to the hash function 3007.

The hash function 3007 subjects the first section $P_1$3002 to the character-substitution/transposition repeating processing 3005 by using an initial value 3004 as a parameter, thereby calculating a first intermediate output.

Subsequently, the hash function subjects the second section $P_2$3003 to the character-substitution/transposition repeating processing 3005 by using the first intermediate output as a parameter (in place of the initial value 3004), thereby calculating a second intermediate output.

The above processing is repeated until the data of the final section is input, and the finally calculated intermediate output is used as a hash value Hash 3006.

Here, in the paper 1, an encryption function (block encryption) such DES of USA encryption standard is used for the character-substitution/transposition repeating processing 3005. Such a hash function is called a "hash function using block encryption", and it has been standardized in ISO (International Organization for Standardization).

The "hash function using block encryption" will be described below.

As shown at the right side of FIG. 27, the first section $P_1$3002 is input to the encryption function 3009 with a parameter which is obtained by converting the initial value 3004 with a conversion function 3008. Exclusive OR 3010 is conducted between the encryption result based on the encryption function 3009 and the first section $P_1$3002 bit by bit, thereby calculating the first intermediate output based on the character-substitution/transposition repeating processing 3005.

Subsequently, the first intermediate output is fed back and then converted with the conversion function 3008. Thereafter, by using the first intermediate output thus converted as a parameter, the second section $P_2$3003 is input to the encryption function 3009. The exclusive OR 3010 is conducted between the encryption result based on the encryption function 3009 and the second section $P_2$3003 bit by bit, thereby calculating the second intermediate output based on the character-substitution/transposition repeating processing 3005.

The above processing is repeated until the data of the final section is input, and the finally-calculated intermediate output is used as the hash value Hash 3006.

When DES or the like is used for the encryption function 3009 in the "hash function using block encryption" shown at the right side of FIG. 27, the length of each section of the first section $P_1$3002, the second section $P_2$3003, . . . , and the length of the output of the character-substitution/transposition repeating processing 3005 are respectively equal to 64 bits, and thus the length of the hash value Hash 3006 is equal to 64 bits.

The feature of the "hash function using block encryption" resides in that the length of each section $P_1$3002, $P_2$3003, . . . of the message is equal to the length of the output of the character-substitution/transposition repeating processing 3005.

A hash function which does not use any encryption function such as DES in the character-substitution/transposition repeating processing 3005 is proposed. Such a hash function is called a "special-purpose hash function", and there are known MD5 which is an internet standard, SHA-1 and RIPEMD-16 which are being standardized in ISO, etc.

Of these special-purpose hash functions, MD5 is disclosed in the following paper 2:

R. Rivest, "The MD5 Message—Digest Algorithm," IETF RFC 1321 (1992) The processing flow of MD5 itself is the same as shown at the left side of FIG. 27, and it will be described with reference to the left side of FIG. 27.

First, a message 3001 to be compressed is divided into a first section $P_1$3002, a second section $P_2$3003, . . . every 512 bits, and these sections are successively input to the hash function 3007.

The hash function 3007 subjects the first section $P_1$3002 to simple character-substitution/transposition repeating processing 3005 by using an initial value 3004 of 128 bits as a parameter, thereby calculating a first intermediate output of 128 bits.

Subsequently, by using the first intermediate output as a parameter (in place of the initial value 3004), the hash function 3007 subjects the second section $P_2$3003 to the simple character-substitution/transposition repeating processing 3005, thereby calculating a second intermediate output of 128 bits.

The above processing is repeated until the data of the final section is input, and the finally-calculated 128-bit intermediate output is used as a hash value Hash 3006.

The feature of the "special-purpose hash function" resides in that the length of the output of the character-substitution/transposition repeating processing 3005 is shorter than the length of each section $P_1$3002, $P_2$3003, . . . of the message.

The above prior arts have the following problems.

(1) Problem of Hash function which has been hitherto proposed

①. Problem of "hash function using block encryption"

As described above, the "hash function using block encryption" uses an encryption function (block encryption) such as DES. In the block encryption, the data length of each of the input data and the output data is set to 64 bits. Therefore, the length of the hash value is equal to 64 bits. Further, in order to guarantee that "substantially only one hash value exists in the world" for one input data (message), it is believed that the length of the hash value must be set to about 128 bits or more as described above.

Accordingly, when a hash value of 128 bits is obtained in the "hash function using block encryption", it is necessary to perform the block encryption processing on each input data (64 bits) to the block encryption twice while varying the initial value or the like. That is, it is necessary to calculate the output (64 bits) twice for each input data (64 bits) to the block encryption. This reduces the processing speed of generating hash values.

②. Problem of "special-purpose hash function"

According to the "special-purpose hash function", unlike the "hash function using block encryption", a hash value of 128 bits can be obtained without performing the character-substitution/transposition repeating processing twice for each data into which the message is divided.

However, in the "special-purpose hash function", each data into which the message is divided is subjected to the simple character-substitution/transposition repeating processing to obtain hash values as described above. Here, the length of the output value of the character-substitution/transposition repeating processing (128 bits in the above case) is shorter than the length of the input value (512 bits in the above case). That is, the compression is performed in the character-substitution/transposition repeating processing.

Therefore, in the case where the message is divided into plural data every 512 bits, when there are assumed two messages in which the data of only the final sections thereof are different, in a process of compressing the data (512 bits) of the final section to the output of 128 bits through the character-substitution/transposition repeating processing, the outputs (i.e., hash values) of the two messages are coincident with each other with high probability. This deteriorates the collision free property.

③. The problems of ①, ② also occur not only in the case where the hash function is applied to the digital signature, but also in other cases. For example, the same problems occur in a case where the hash function is applied to a data encryption system.

(1) Problem of public key cipher system

①. A lot of processing time is needed when long data are encrypted by using the public key cipher.

②. In the case where the public key cipher system is applied to the data encryption for electronic mail, etc., when the same electronic mail is transmitted to plural destinations with encryption, a transmitter must carry out the encryption processing on the electronic mail for every destination by using public keys which are distributed from the plural destinations in advance. That is, the encryption processing of the electronic mail must be repeated plural times, number being equal to the number of destinations.

On the other hand, when a receiver loses a secret key due to his/her erroneous erasure of the secret key from a file, the recipient cannot encrypt an encrypted electronic mail which is transmitted to the recipient while encrypted with a public key which was distributed to the sender by the recipient.

SUMMARY OF THE INVENTION

In view of the above condition, the object of the present invention is to rapidly generate hash values, keys, and cipher text which have a high degree of data scrambling. Further, another object of the present invention is to enable decryption of a personally sent encryption data by the cooperation of more than two other recipients even when the secret key is lost because of erroneous erasing from the file etc.

The present invention has been implemented in view of the situation, and according to a first aspect of the present invention, a hash value generating method which is used for digital signature or data encryption comprises:

a first step for dividing target data into at least two blocks;

a second step for performing character-substitution and/or transposition processing on any one of the at least two blocks obtained in the first step;

a third step for performing multiplication on the data obtained in the second step so that the multiplication result is longer than the data length of the data concerned;

a fourth step for further dividing the data obtained in the third step into at least two blocks; and a fifth step for performing character-substitution and/or transposition processing on each of the at least two blocks obtained in the fourth step.

In the hash value generating method of the first aspect of the present invention, during the process of generating hash values, multiplication is such that the length of the output value is longer than that of the input value as described above is performed. According to the multiplication processing, each bit of the output value is affected by each bit of the input value, so scrambling of data can be performed with high efficiency.

The multiplication processing, particularly the processing speed thereof, is enhanced due to recent developments in the field of microprocessors. Accordingly, hash values having a high degree of data scrambling can be generated rapidly.

Further, according to a second aspect of the hash value generating method of the present invention, a hash value generating method which is used for digital signature or data encryption comprises:

a first step for dividing target data into at least two blocks; and a second step for subjecting at least one of the at least two blocks obtained in the first step to an injection extension transformation in which an output value is absolutely different if an input value is different (injection) and the length of the output value is longer than the length of the input value (extension).

According to the second aspect of the hash value generating method of the present invention, during the hash value generating process, the injection extension transformation is performed so that the length of the output is set to be longer than that of the input, and if the input value is different, the output value is absolutely different. Therefore, a hash value having high collision free property, that is, a safe hash value, can be generated.

Here, the target data may be mixed with the initial value which is used as a parameter in the injection extension transformation and then input to the first step element, thereby reducing the probability that the same hash value is introduced for different initial values (i.e., the probability of occurrence of initial value collision).

Further, the target data which are input to the first step may be input to the first step again, thereby reducing the probability that the same hash value is introduced for different messages (i.e., the probability of occurrence of message collision).

According to a third aspect of the present invention, a data encryption method for encrypting data having a fixed length and outputting encryption data having a fixed length, comprises:

a first step for subjecting target data to character-substitution and/or transposition processing;

a second step for subjecting data obtained in the first step to such multiplication processing that the multiplication result is longer than the data length of the data concerned;

a third step for dividing the data obtained in the second step into at least two blocks; and a fourth step for performing character-substitution and/or transposition processing on each of the at least two blocks obtained in the third step.

In the data encryption method of the third aspect of the present invention, during the data encryption process, the multiplication is performed so that the length of the output is longer than that of the input value, and thus the scrambling of the data can be efficiently performed.

Further, according to a fourth aspect of the present invention, a data encryption method using public key cipher for encrypting plain text by using a public key, comprises:

a first step for encrypting plain text by using as a parameter data which are obtained by converting a first public key; and a second step for generating a data value satisfying a relational equation between data based on at least one second public key and the data obtained by converting the first public key, the relational equation being capable of directly or indirectly determine the data obtained by converting the first public key if the data based on the second public key are known, wherein the data value obtained in the second step is added to cipher text obtained in the first step as encryption data to be transmitted.

Further, according to a fifth aspect of the present invention, a data decryption method which is paired with the data encryption method of the fourth aspect of the present invention, comprises:

A third step for determining the data based on the second public key from a secret key which is paired with the second public key;

A fourth step for determining the data obtained by converting the first public key on the basis of the data value added to the cipher text and the data obtained in the third step; and A fifth step for decrypting the cipher text by using the data obtained in the fourth step as a parameter.

According to the data encryption method of the fourth aspect of the present invention and the data decryption method of the fifth aspect of the present invention which is paired with the data encryption method, a person having a secret key which is paired with the second public key can gain the data obtained by converting the first public from the data value generated in the second step alone or in cooperation with another person having a secret key which is paired with another second public key.

Accordingly, not only any person having a secret key which is paired with the first public key, but also any person having a secret key which is paired with the second public key can decrypt the data.

This means that when the same electronic mail is transmitted to plural destinations with encryption, it is unnecessary for a transmission side to encrypt the electronic mail while using public keys distributed from the respective destinations one by one.

DETAILED DESCRIPTION OF THE PREFERRED EMBODIMENTS

Preferred embodiments according to the present invention will be described hereunder with reference to the accompanying drawings.

Initially, the first embodiment of the present invention will be described.

Figure 1:
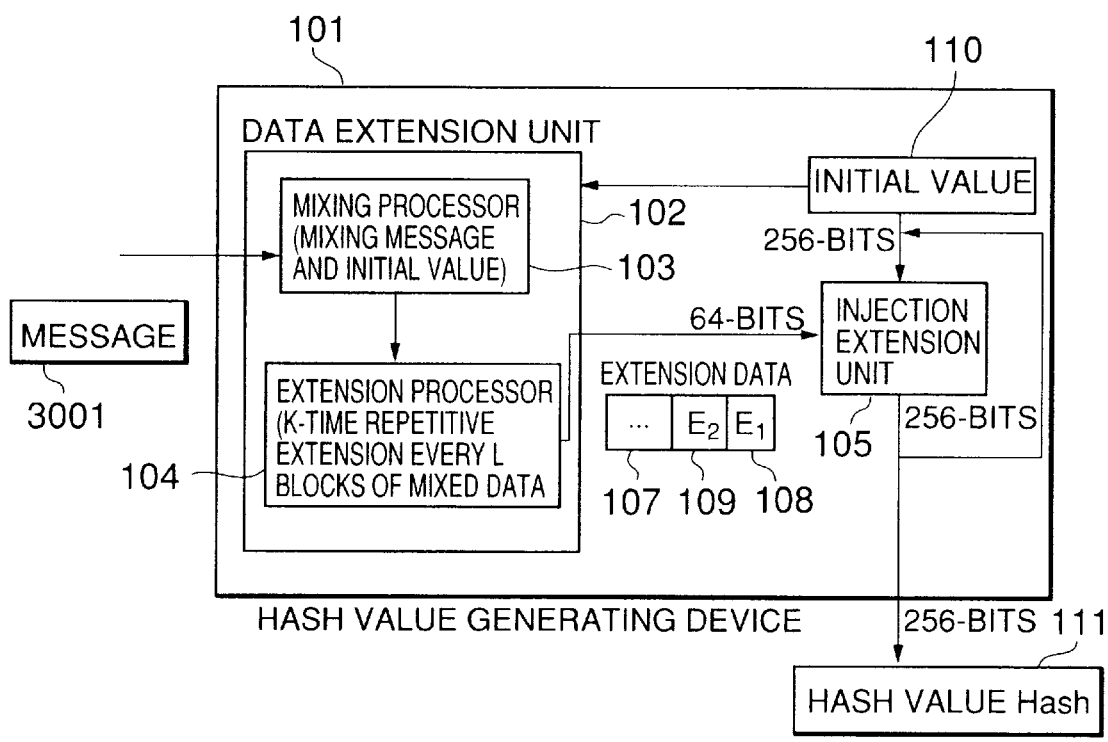
FIG. 1 is a diagram showing the functional constitution of a hash value generating device according to a first embodiment of the present invention.

FIG. 1 is a diagram showing the functional constitution of a hash value generating device according to a first embodiment of the present invention. The hash value generating device can be implemented through execution of a predetermined program by a microprocessor in an information processing device having the microprocessor such as a personal computer, an IC card or the like. Further, it may be implemented by only one LSI. The hash value generating device can be applied to data encryption for digital signature, electronic mailing, etc.

In FIG. 1, when a message 3001 to be compressed is input to the hash value generating device 101, the following processing is performed in a data extension unit 102.

① In a mixing processor 103, mixing processing between the input message 3001 and the initial value is performed. This mixing processing will be described later.

② In an extension processing unit 104, the extension processing is repetitively performed on the mixed data obtained in the mixing processor 103 for K times every L blocks. The K-times repetitive extension processing every L blocks will be described later.

The extension data 107 of the message 3001 are generated on the basis of the processing of ①, ②.

The extension data 107 generated in the data extension unit 102 are divided into respective 64-bit frames (a lump of blocks) like a first section $E_1$ 108, a second section $E_2$ 109, . . . , and these frames are successively input to the injection extension unit 105.

The injection extension unit 105 subjects the first section $E_1$ 108 to the injection extension processing (which will be described later) by using an initial value 110 of 256 bits as a parameter while performing character-substitution/transposition, thereby calculating a first intermediate output of 256 bits.

Subsequently, by using the first intermediate output as a parameter ( in place of the initial value 110), the injection extension unit 105 subjects the second section $E_2$ 109 to the injection extension processing while performing character-substitution/transposition, thereby calculating a second intermediate output of 256 bits.

The above processing is repeated until the frame of the final section is input, and the finally-calculated 256-bit intermediate output is used as a hash value Hash 111.

Next, the processing of each part of the hash value generating device 101 shown in FIG. 1 will be described in more detail.

First, the processing in the mixing processor 103 of the data extension unit 102 will be described.

The mixing processor 103 performs the processing of dividing each of the message 3001 and the initial value 110 into plural data blocks and then mixing both the blocks.

Figure 2:
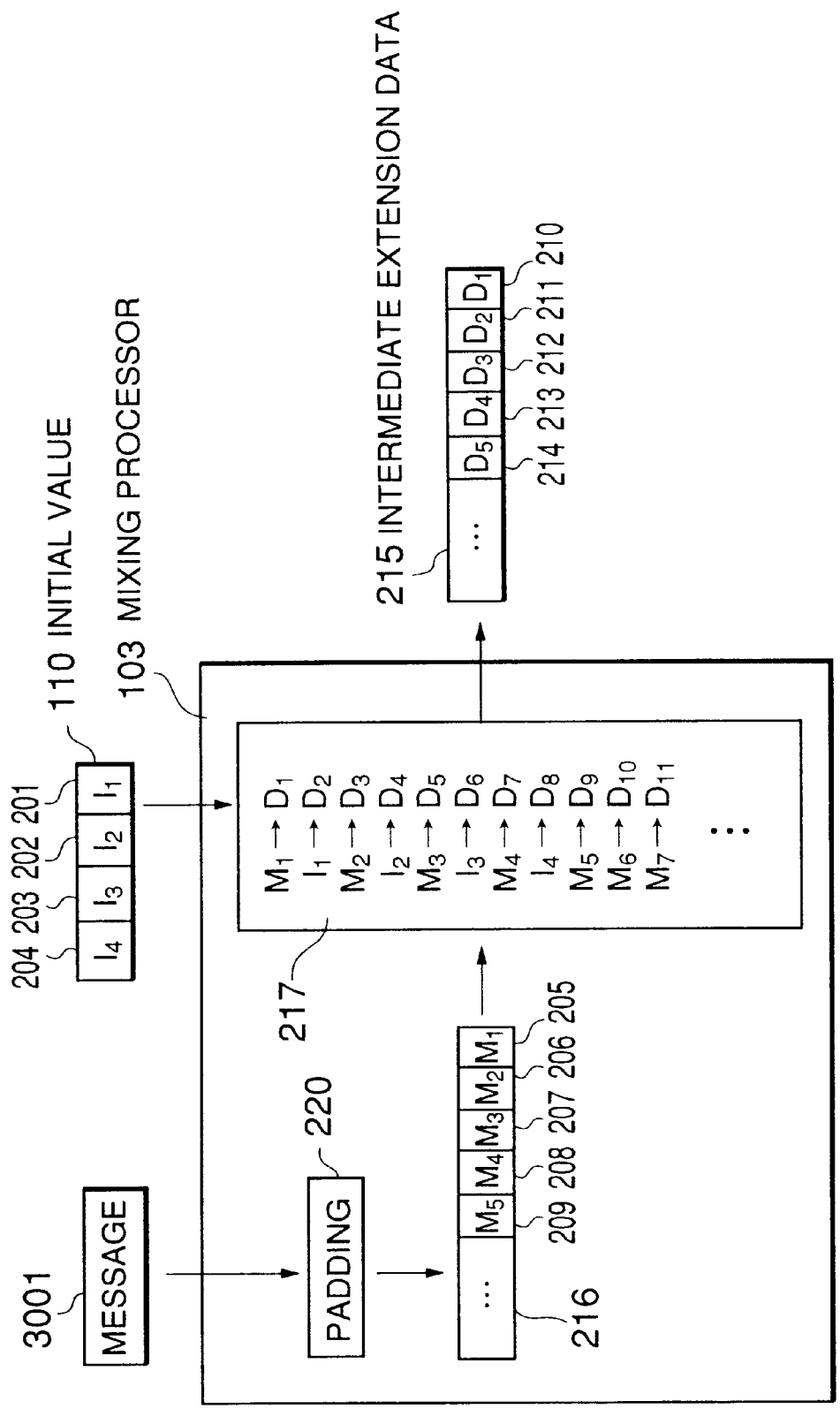
FIG. 2 is a diagram showing an example of processing in a mixing processor 103 shown in FIG. 1.

FIG. 2 is a diagram showing an example of the processing in the mixing processor 103.

Here, the initial value 110 comprises four 64-bit data blocks $I_1$201, $I_2$202, $I_3$ 203, $I_4$204 which are streamed in this order.

First, in a padding processor 220, the message 3001 is processed so that the sum of the length of the message 3001 and the length of the initial value 110 (256 bits) is set to a integral multiple of L×64.

Here, L represents a value defined by the K-time repetitive extension processing every L blocks which is performed in the extension processor 104 as described later. "64" represents the bit length of the frame (data of one section) input to the injection extension unit 105.

Specifically, the padding processor 220 processes the message 3001 as described later.
①When the sum of the length of the message 3001 and the length (256 bits) of the initial value 110 is equal to an integral multiple of L×64 bits, bits "11" and bits of (L×64-2) "0101 . . . " are connected to the rear portion of the message 3001 in this order.
②When the sum of the length of the message 3001 and the length (256 bits) of the initial value 110 is not equal to an integral multiple of L×64 bits, bits "11" and bits having any number "0101" between zero bit and (L×64-1) bits are connected to the rear portion of the message 3001 in this order. With this arrangement, the overall length of the message 3001 can be set to an integral multiple of L×64.

Subsequently, in the padding processor 220, the message 3001 which is processed so that the overall length thereof is equal to an integral multiple of L×64 is converted to data 216 comprising 64-bit data blocks of N ($M_1$205, $M_2$206, $M_3$207, $M_4$208, $M_5$209, . . . ) which are streamed in this order.

Thereafter, in a processor 217, the 64-bit data blocks of N and the four 64-bit data blocks constituting the initial value 110 are mixed with each other. Specifically, as shown in FIG. 2, the following replacement is performed:

"$M_1 \to D_1, I_1 \to D_2, M_2 \to D_3, I_2 \to D_4, M_3 \to D_5, I_3 D_6, M_4 D_7, I_4 \to D_8, M_5 \to D_9, M_6 \to D_{10}, M_7 \to D_{11}, \ldots$"

As a result of the replacement, a sequence of 64-bit data blocks of (N+4) ($D_1$210, $D_2$311, $D_3$212, $D_4$213, $D_5$214 , . . . ) which are streamed in this order are output as intermediate extension data 215.

The length of the intermediate extension data 215 is equal to an integral multiple of L×64 bits.

Next, the processing in the extension processor 104 of the data extension unit 102 will be described.

The extension processor 104 performs the extension processing on the intermediate extension data 215.

Figure 3:
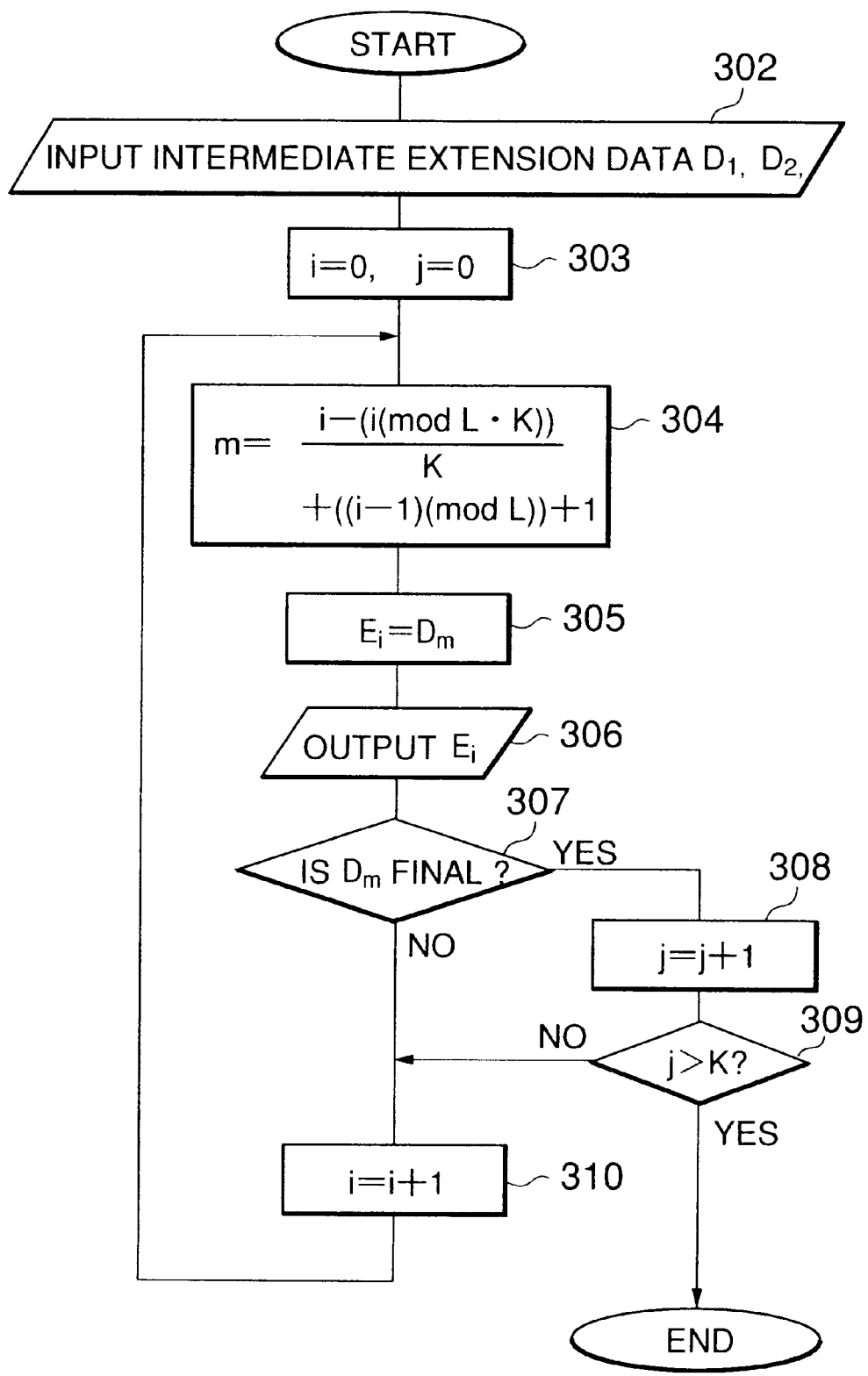
FIG. 3 is a flowchart showing an example of processing in an extension processor 104 shown in FIG. 1.

FIG. 3 is a flowchart showing an example of the processing in the extension processor 104.

In this case, the operation of copying L blocks of the intermediate extension data 215 and then adding the copied data to the rear side of the final block of the L blocks of the intermediate extension data 215 is repetitively performed for K times every L blocks. In this embodiment, this processing is referred to as "the K-time repetitive extension processing every L blocks".

First, in step 302, the 64-bit data blocks of (N+4) ($D_1$210, $D_2$311, $D_3$212, $D_4$213, $D_5$214, . . . ) constituting the intermediate extension data 215 obtained in the mixing processor 103 are input.

Subsequently, in step 303, it is set that i=1, and j=0. Subsequently, in step 304, m is calculated from the following equation:

$m=(i-(i \pmod{L \cdot K}))/K+((i-1) \pmod{L})+1$

Here, mod X represents the processing of taking a residual when a value is divided by X. For example, 5 (mod 2)=1

Next, in step 305, an m-th data block $D_m$ of the 64-bit data blocks of (N+4) constituting the intermediate extension data 215 is set in an i-th frame $E_i$ of the frames constituting the above extension data 107.

Subsequently, in step 306, the frame $E_i$ set in step 305 is output.

Next, in step 307, it is judged whether the m-th data block $D_m$ corresponds to the final block of the 64-bit data blocks of (N+4) which constitute the intermediate extension data 215. If it is the final block, the processing goes to step 308, and if not so, the processing goes to step 310.

In step 308, the value of j is incremented by "1" (j=j+1), and the processing goes to step 309.

In step 309, it is judged whether j is larger than K (j>K?). If j is larger than K, this processing flow is ended. If j is below K, the processing goes to step 310.

In step 310, the value of i is incremented by "1" (i=i+1), and then the processing goes to step 304.

By executing the above processing flow, the K-time repetitive extension processing every L blocks as described above is performed on the intermediate extension data 215, so that the frames $E_1$108, $E_2$109, . . . which constitute the extension data 107 shown in FIG. 1 are successively output. The extension data 107 is K times as large as the intermediate enlarged data 215.

Next, the processing in the injection extension unit 105 will be described.

The injection extension unit 105 of this embodiment is the same as the conventional "hash function using block encryption" and "special-purpose hash function" in the point that the injection extension unit 105 performs the character-substitution/transposition processing on the extension data 107 input thereto.

However, the injection extension unit 105 of this embodiment is different from the conventional hash function in the point that the injection extension unit transforms the input frames so that for the respective frames constituting the extension data 107, if the input value to the injection extension unit 105 is different, the output value is also different (injection), and the length of the output value is longer than the input value (extension). In this embodiment, this processing is referred to as "injection extension processing".

Figure 4:
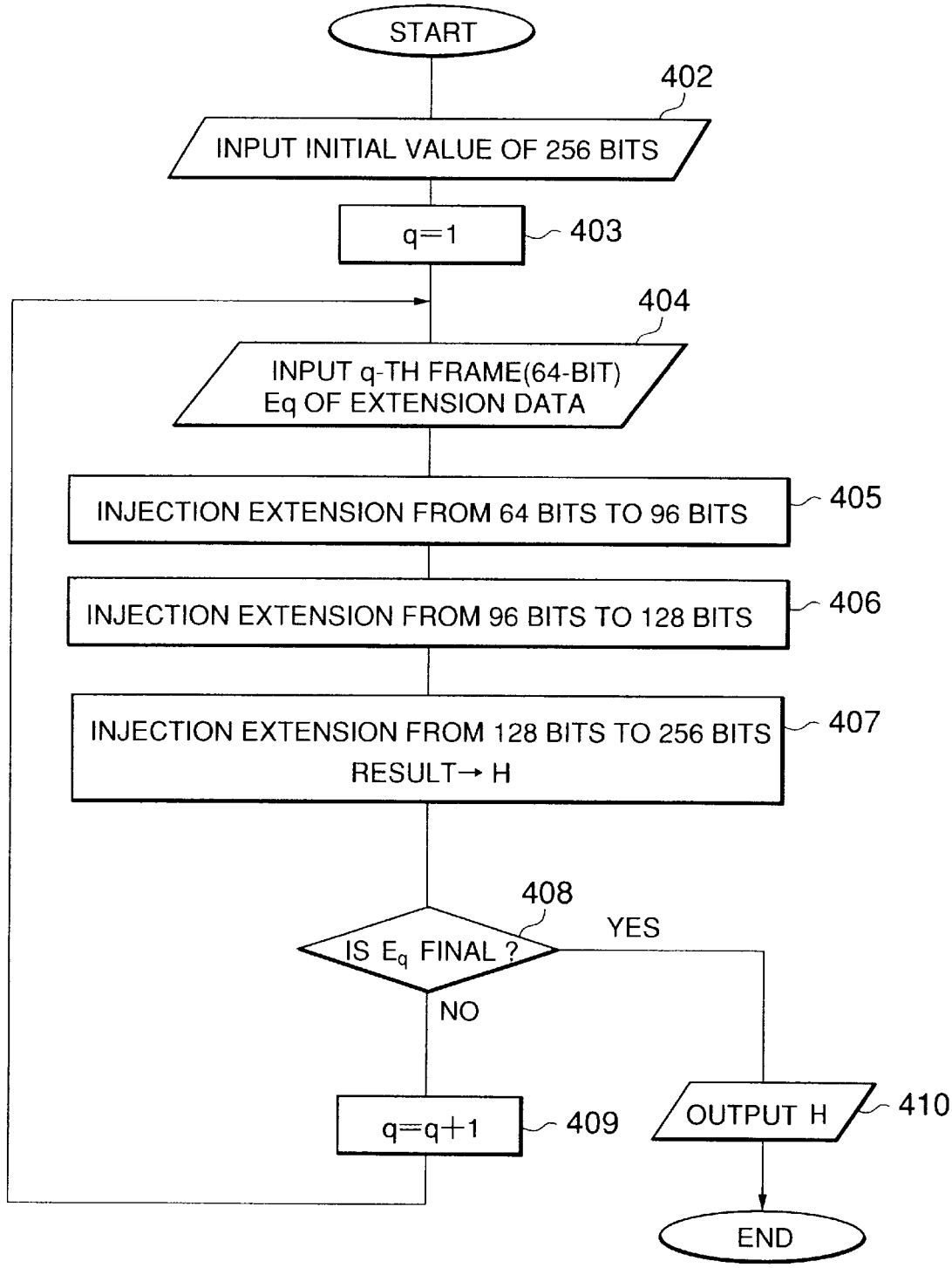
FIG. 4 is a flowchart showing an example of processing in an injection extension unit 105 shown in FIG. 1.

FIG. 4 is a flowchart showing an example of the processing in the injection extension unit 105.

First, in step 402, the initial value 110 of 256 bits is input, and it is set to H.

Subsequently, in step 403, q is set to 1.

Subsequently, in step 404, a q-th frame $E_q$ of the extension data 107 shown in FIG. 1 is input.

Subsequently, in step 405, the injection extension processing is performed on the frame $E_q$ by using H parameter so that the length of the frame $E_q$ is extended from 64 bits to 96 bits.

Subsequently, in step 406, the injection extension processing is performed on the data obtained in step 405 by using H as a parameter so that the length of the data is extended from 96 bits to 128 bits.

Thereafter, in step 407, the injection extension processing is performed on the data obtained in the step 406 so that the length of the data is extended from 128 bits to 256 bits. The data of 256 bits thus obtained is set to H.

Subsequently, in step 408, it is judged whether the q-th frame $E_q$ corresponds to the final frame of the frames $E_1$, $E_2$, ... constituting the extension data 107. If it is the final frame, the processing goes to step 410. If not, the processing goes to step 409.

In step 409, the value of q is incremented by "1" (q=q+1), and then the processing returns to step 404.

In step 410, the data H of 256 bits which is set in the step 407 is for the final frame of the frames constituting the extension data 107, so that H is output as the hash value Hash 111.

Next, the injection extension processing in the steps 405 to 407 shown in FIG. 4 will be described.

First, the injection extension processing (injection extension from 64 bits to 96 bits) in the step 405 shown in FIG. 4 will be described.

Figure 5:
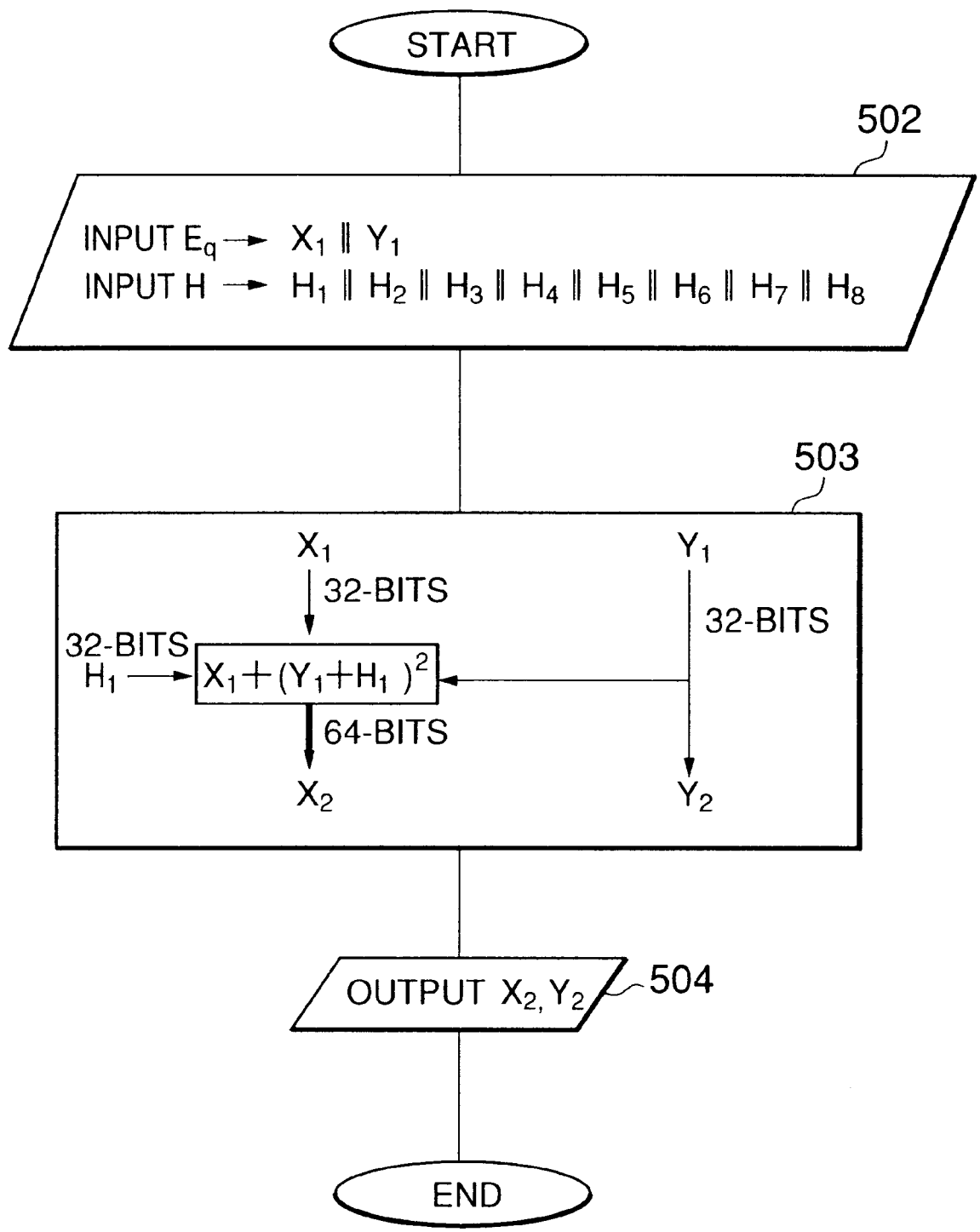
FIG. 5 is a flowchart showing an example of injection extension processing from 64-bit data to 96-bit data in step 405 shown in FIG. 4.

FIG. 5 is a flowchart showing an example of the injection extension processing from 64-bit data to 96-bit data in the step 405 shown in FIG. 4.

First, in step 502, the 64-bit frame $E_q$ input in the step 404 shown in FIG. 4 is divided into upper 32-bit data $X_1$ and lower 32-bit data $Y_1$. When the data H of 256 bits (the value set in the step 402 when the frame input in step 404 is the first frame $E_1$ or the value set in step 407 which is executed immediately before when the frame input in step 404 is a second or subsequent frame $E_2$ ... in FIG. 4) is divided from the head thereof every 32 bits to obtain eight 32-bit data $H_1$, $H_2, H_3, \ldots, H_8$.

Subsequently, in step 503, the processing shown by the following equation is performed to generate $X_2$ and $Y_2$:

$$X_2 = X_1 + (Y_1 + H_1)^2$$

$$Y_2 = Y_1$$

As a result, $X_2$ becomes 64-bit data, and $Y_2$ becomes 32-bit data. In step 503 of FIG. 5, a heavy-line arrow represents flow of 64-bit data, and a fine line arrow represents flow of 32-bit data.

Subsequently, in step 504, $X_2$, $Y_2$ are output, and then this flow is ended.

Through the above processing flow, the frame $E_q$ comprising the 32-bit data $X_1$ and the 32-bit data $Y_1$ can be extended to the data of 96 bits in total which comprise 64-bit data $X_2$ and the 32-bit data $Y_2$. In addition, the relationship that governs that $X_2, Y_2, X_1$ and $Y_1$ are uniquely determined from $X_1 = X_2 - (Y_2 + H_1)^2$ and $Y_1 = Y_2$ can be established, that is, the injection relationship can be established.

Accordingly, the injection extension from 64-bit data to 96-bit data can be performed by the above processing flow.

However, the processing in the step 405 shown in FIG. 4 is not limited to that of FIG. 5, and any processing may be used insofar as it performs the injection extension processing from 64-bit data to 96-bit data.

Next, the injection extension processing (injection extension from 96 bits to 128 bits) in step 406 shown in FIG. 4 will be described.

Figure 6:
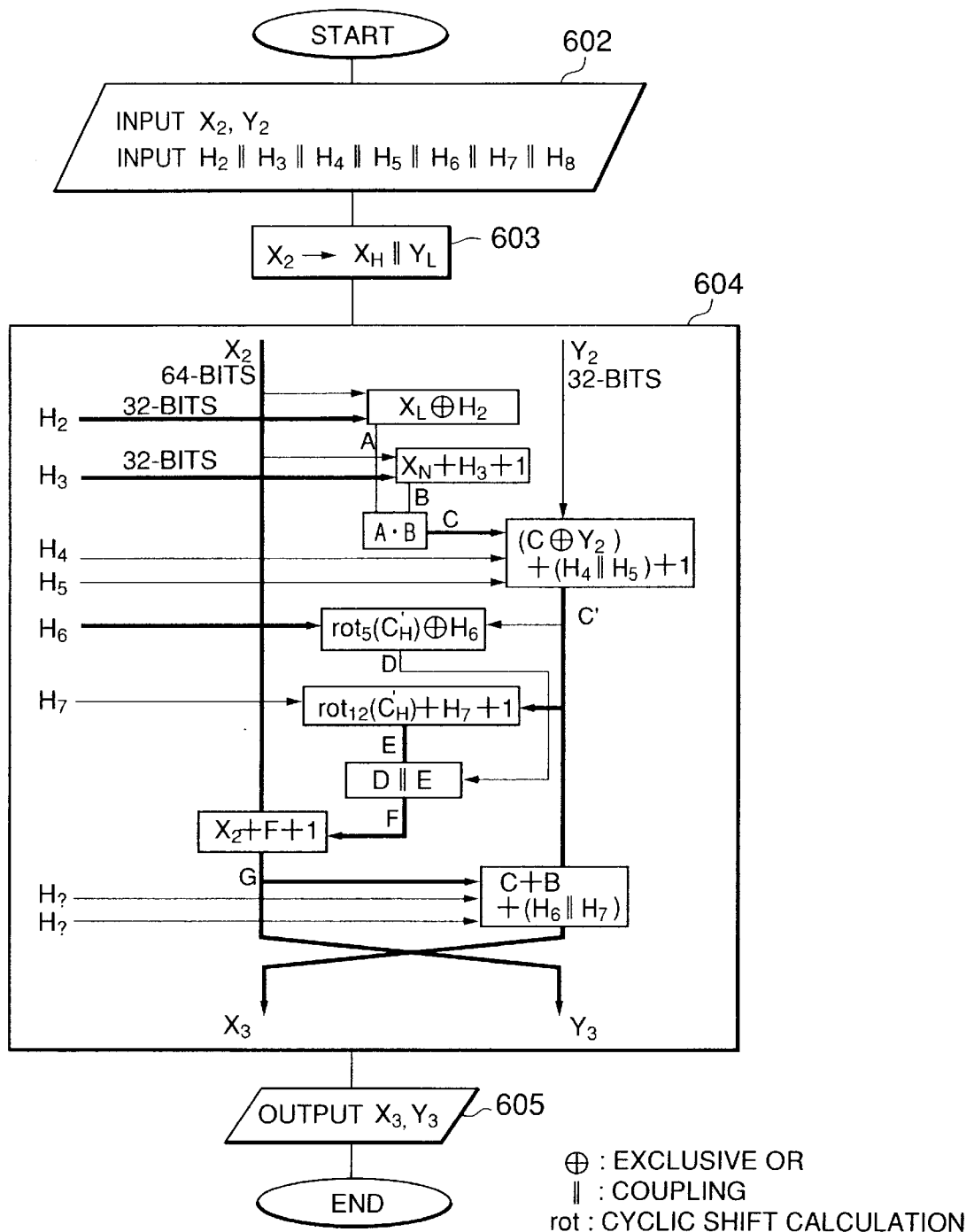
FIG. 6 is a flowchart showing an example of injection extension processing from 96-bit data to 128-bit data in step 406 shown in FIG. 4.

FIG. 6 is a flowchart showing an example of the injection extension processing from 96-bit data to 128-bit data in step 406 shown in FIG. 4.

First, in step 602, the 64-bit data $X_2$ and the 32-bit data $Y_2$ which are generated in the flow of FIG. 5 are input, and further $H_2, H_3, H_4, H_5, H_6, H_7, H_8$ of eight 32-bit data $H_1$, $H_2, H_3, \ldots, H_8$ which are generated by dividing 256-bit data H in step 502 of FIG. 5 are input.

Subsequently, in step 603, the 64-bit data $X_2$ are divided into upper 32-bit data $X_H$ and lower 32-bit data $X_L$.

Thereafter, in step 604, $X_3, Y_3$ are generated by successively performing the processing as indicated by the following equations:

$$A = X_L \text{ eor } H_2$$

$$B = X_H + H_3 + 1$$

$$C = A \cdot B$$

$$C' = (C \text{ eor } Y_2) + (H_4 \| H_5) + 1$$

$$C'_H \| C'_L = C'$$

$$D = \text{rot}_5(C'_L) \text{ eor } H_6$$

$$E = \text{rot}_{12}(C'_H) + H_7 + 1$$

$$F = (D \| E)$$

$$G = X_2 + F + 1$$

$$X_3 = C' + G + (H_8 \| H_1)$$

$$Y_3 = G$$

Here, "eor" represents Exclusive Or of every bit. For example, 110010 eor 011001=101011. Further, "+" represents addition. When up-shift occurs in the calculation of the most significant bit, the up-shift portion is neglected. For example, 101101+100100=010001.

"$\|$" represents coupling of data. For example, 111111$\|$000000=11111000000. "$\text{rot}_T(U)$" represents data obtained by cyclically shifting numerical value data U to the upper side by T bits. For example, $\text{rot}_2(110000) = 000011$. Here, the left side of the numeral value data corresponds to the upper side.

The processing indicated by the above equations is successively performed, whereby $X_3$ and $Y_3$ are generated as 64-bit data, respectively. In step 604 of FIG. 6, the heavy line arrow represents the flow of the 64-bit data, and the fine line arrow represents the flow of the 32-bit data.

Subsequently, in step 605, $X_3, Y_3$ are output, and then this flow is ended.

Through the above flow, the data of 96 bits in total which comprise the 64-bit data $X_2$ and the 32-bit data $Y_2$ can be extended to the data of 128 bits in total which comprise the 64-bit data $X_3$ and the 64-bit data $Y_3$, and the injection relationship can be established wherein when $X_3$, $Y_3$ are given, $X_2$ and $Y_2$ are uniquely determined.

The processing in the step 406 shown in FIG. 4 is not limited to that of FIG. 6, and any processing may be used insofar as it can perform the injection extension processing from 96-bit data to 128-bit data.

Next, the injection extension processing (the injection extension from 128 bits to 256 bits) in step 407 shown in FIG. 4 will be described.

Figure 7:
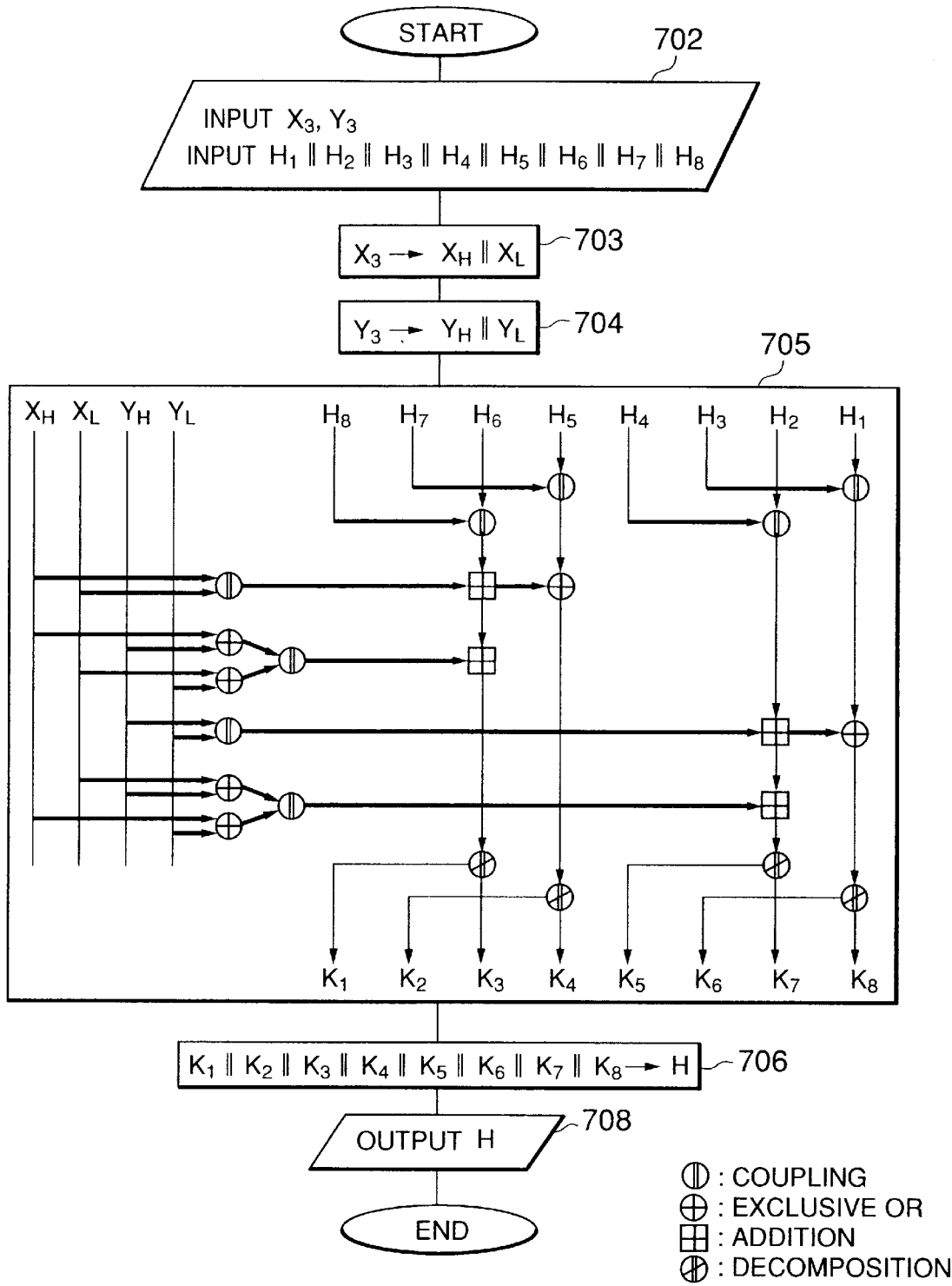
FIG. 7 is a flowchart showing an example of injection extension processing from 128-bit data to 256-bit data in step 407 shown in FIG. 4.

FIG. 7 is a flowchart showing an example of the injection extension processing from 128-bit data to 256-bit data in step 407 shown in FIG. 4.

First, in step 702, the 64-bit data $X_3$, $Y_3$ which are generated in the flow shown in FIG. 6 are input. Further, the eight 32-bit data $H_1$, $H_2$, $H_3$, $H_4$, $H_5$, $H_6$, $H_7$, $H_8$ which are generated by dividing the 256-bit data H in step 502 of FIG. 5 are input.

Subsequently, in step 703, the 64-bit data $X_3$ are divided into upper 32-bit data $X_H$ and lower 32-bit data $X_L$.

Thereafter, in step 704, the 64-bit data $Y_3$ is divided into upper 32-bit data $Y_H$ and lower 32-bit data $Y_L$. Subsequently, in step 705, by performing the processing indicated by the following equations, $K_1$, $K_2$, $K_3$, ..., $K_8$ are generated while repeating the character-substitution/transposition.

$$K_1 \| K_3 = (H_8 \| H_6) + (H_H \| X_L) + ((X_H \text{eor} Y_H) \| (X_L \text{eor} Y_L))$$

$$K_2 \| K_4 = (H_7 \| H_5) \text{ eor } ((H_8 \| H_6) + (X_H \| X_L))$$

$$K_5 \| K_7 = (H_4 \| H_2) + (Y_H \| Y_L) + ((X_L \text{eor} Y_H) \| (X_H \text{eor} Y_L))$$

$$K_6 \| K_8 = (H_3 \| H_1) \text{ eor } ((H_4 \| H_2) + (Y_H \| Y_L))$$

As a result, each of the data $K_1$, $K_2$, $K_3$, $K_4$, $K_5$, $K_6$, $K_7$, $K_8$ becomes 32-bit data. In step 705 of FIG. 7, the fine line arrow represents the flow of the 32-bit data.

Subsequently, in step 706, $K_1$, $K_2$, $K_3$, $K_4$, $K_5$, $K_6$, $K_7$, $K_8$ are successively coupled to one another in this order to generate H ($K_1 \| K_2 \| K_3 \| K_4 \| K_5 \| K_6$ $K_7 \| K_8 \rightarrow$H), whereby H becomes data of (32 bits X 8=256 bits).

In step 708, H generated in step 706 is output, and then this flow is ended.

Through the above flow, the data of 128 bits in total which comprise the 64-bit data $X_3$ and the 64-bit data $Y_3$ can be extended to the data H of 256 bits, and the injection relationship that when given H, $X_3$ and $Y_3$ are uniquely determined.

Through the above flow, the injection extension from 128-bit data to 256-bit data can be performed.

The processing in step 407 shown in FIG. 4 is not limited to that of FIG. 7, and any processing may be used insofar as it can perform the injection extension processing from 128-bit data to 256-bit data.

In the above-described first embodiment, during the process of generating the hash value by using the input frame $E_q$ and the initial value 110 or H which is an output of the injection extension unit 105, the multiplication processing for respective 32-bit data (the processing $X_2 = X_1 + (Y_1 + H_1)^2$ in step 503 of FIG. 5 and the processing C=A·B in step 604 of FIG. 6) is performed in the character-substitution/transposition processing. In addition, the cyclic shift calculation on the 32-bit data is also carried out (the processing $D = \text{rot}_5(C'_L)$ eor $H_6$, $E = \text{rot}_{12}(C'_H) + H_7 + 1$ in step 604 of FIG. 6).

With the above operation, compared with the conventional "hash function using block encryption" and "the special-purpose hash function", the hash value a having higher degree of data scrambling can be quickly generated.

That is, in the multiplication of the 32-bit data (32 bits×32 bits→64 bits), each bit of the output 64-bit data is affected by all the input bits. Therefore, the degree of scrambling of the data is high and thus the character-substitution processing can be performed efficiently.

In the case of the 100 MHz Pentium processor produced by Intel Corporation, which has currently become widely used as a microprocessor for personal computers, the product calculation (multiplication) can be carried out at about ten million times a second. This means that the processing speed is increased to about 20 times of the 20 MHz 68020 processor produced by Motorola Incorporation, which was made public in the middle of the 1980s and could perform the product calculation at about 0.5 million times a second.

In addition, the former processor is more effective to perform the cyclic shift calculation of 32-bit data since character-substitution processing is performed efficiently.

In the operation processing based on the microprocessor, the cyclic shift calculation, that is, the transposition processing of 32-bit data, can be implemented by only one processing step. However, according to a recent microprocessor, for example, a Pentium processor produced by Intel Corporation, the cyclic shift is completed in one cycle. According to the 100 MHz Pentium processor produced by Intel Corporation, the cyclic shift calculation processing can be carried out at about one hundred million times per second. This means that the processing speed is increased to about forty times of the 20 MHz 68020 processor produced by Motorola Incorporation which was made public in the middle of the 1980s and could perform the cyclic shift at about 2.5 million times a second.

As described above, according to the first embodiment, when the character-substitution/transposition processing is performed, the hash value having a higher degree of data scrambling can be rapidly generated by using the basic operation of the microprocessor which is particularly effective owing to recent technical innovations.

In the conventional "hash function using block encryption" and "the special-purpose hash function", the character-substitution processing is usually realized by adding 32-bit data to each other. The addition processing of the 32-bit data can be carried out at about one hundred million times for one second in the case of the 100 MHz Pentium processor produced by Intel Corporation. This means that the processing speed is increased to about ten times that of the 20 MHz 68020 processor produced by Motorola Incorporation which was made public in the middle of the 1980s and could carry out the addition processing at about ten million times for one second.

The multiplication processing (32 bit data ×32 bit data) has the same data scrambling effect as obtained when the addition processing is performed 32 times and the cyclic shift processing is performed 32 times. In consideration of this fact, it is more effective to use the multiplication processing than the addition processing at the present time, when the Pentium processors made by Intel Corporation are mainly used.

According to the first embodiment of the present invention, during the process of generating the hash value with the input frame $E_q$ and the initial value 110 or H output from the injection extension unit 105, the injection extension unit 105 for performing the character-substitution/transposition processing performs the transformation processing on the input frame so that with respect to the respective frames which are input to the injection extension unit 105 and constitute the extension data 107, if the input value is different, the output value is totally different (injection), and also so that the length of the output value is longer than that of the input value (extension), thereby generating a hash value having high collision free property, that is, a safety hash value.

That is, in the conventional hash function, when the length of the section (frame) of a message input to the character-substitution/transposition repeating processing is compared with the length of the intermediate output to be output, the length of the intermediate output is equal to the length of the frame to be input (the hash function using block encryption) or shorter than the length of the frame to be input (the special-purpose hash function).

On the other hand, according to the first embodiment of the present invention, using the above-described injection extension processing, the length of the intermediate output (256 bits) is set to be longer than the length of the input frame (64 bits). Accordingly, the message collision problem in the character-substitution/transposition processing which occurs in MD5 can be relatively readily avoided.

Further, according to the first embodiment of the present invention, as shown in FIG. 1, the initial value 110 may be used not only as the first parameter to be input to the injection extension unit 105, but also to generate the extension data 107 by extending the message 3001 as pre-processing before the message 3001 is input to the injection extension unit 105.

Figure 27:
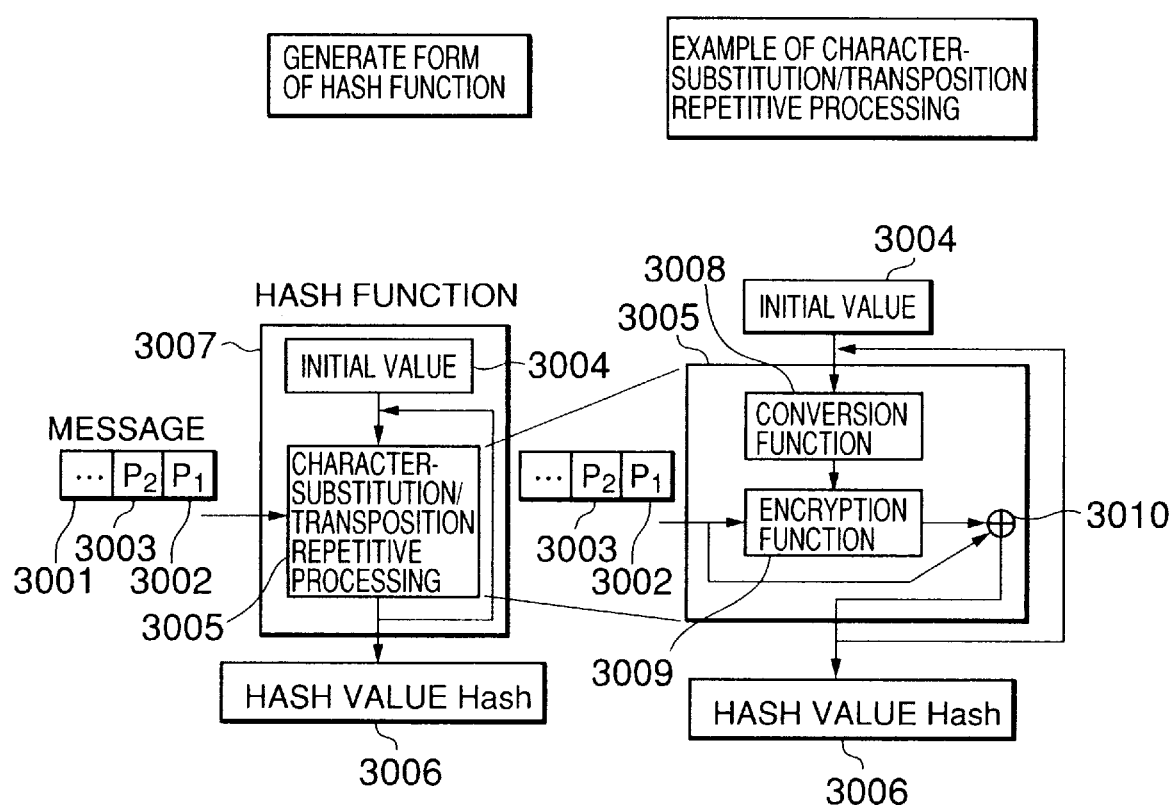
FIG. 27 is a diagram showing a conventional hash function.

With the above operation, compared with the conventional hash function, as shown in FIG. 27, in which the initial value 3004 is used as only the first parameter to be input to the character-substitution/transposition repeating processing 3005, this embodiment can further reduce the probability of the initial collision inducing the same hash value for different initial values.

Further, according to the first embodiment, as shown in FIG. 1, as the pre-processing before the message 3001 is input to the injection extension unit 105, processing is carried out to divide the message into plural blocks and then copying some or all of the plural blocks thus generated to mix the copied blocks with the original plural blocks (which is referred to as "K-time repetitive expansion processing every L blocks" in this embodiment).

With the above operation, compared with the conventional hash function, as shown in FIG. 27, in which the message 3001 concerned is divided to merely generate the plural sections P1, P2, . . . as the pre-processing before the message 3001 is input to the character-substitution/transposition repeating processing 3005, this embodiment can further reduce the message collision probability of the same hash value being derived for different messages.

In the first embodiment described above, the processing as indicated by $X_2=X_1+(Y_1+H_1)^2$ in step 503 of FIG. 5 and the processing as indicated by $C=A \cdot B$ in step 604 of FIG. 6 are performed as the 32-bit data multiplication processing in the injection extension unit 256 for performing the character-substitution/transposition. However, it is needless to say that the multiplication processing used in the present invention is not limited to the above equations.

Likewise, the cyclic shift calculation processing of the present invention is not limited to the processing as indicated by $D=rot_5(C'_L)$ eor $H_6$, $E=rot_{12}(C'_H)+H_7+1$ in step 604 of FIG. 6.

Further, in the above embodiment, the frame E1, E2, . . . of the extension data 107 to be input to the injection extension 105 is set to 64 bits, and the intermediate extension data output from the injection extension unit 105 is set to 256 bits (accordingly, the hash value is set to 256 bits). However, the present invention is not limited to this manner.

A modification of the first embodiment of the present invention in which the frame to be input to the injection extension unit 105 is set to 64 bits and the intermediate output from the injection extension unit is set to 80 bits (accordingly, the hash value is set to 80 bits) will be described hereunder.

Figure 8:
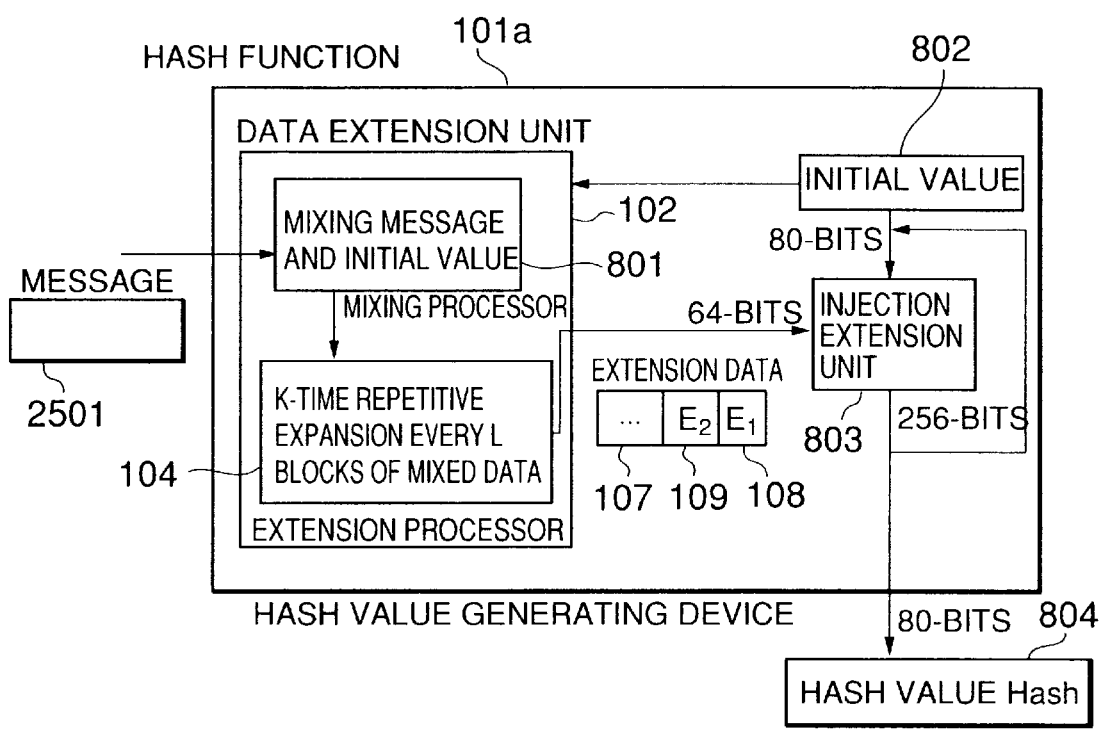
FIG. 8 is a diagram showing the functional constitution of a hash value generating device which is a modification of the first embodiment of the present invention.

FIG. 8 is a diagram showing the functional constitution of a hash value generating device according to a modification of the first embodiment of the present invention. Here, the elements having the same function as the hash value generating device 101 shown in FIG. 1 are represented by the same reference numerals.

The point of difference between the hash value generating device 101a shown in FIG. 8 and the hash value generating device 101 shown in FIG. 1 resides in that an initial value 802 of 80 bits is used in place of the initial value 110 of 256 bits, a mixing processor 801 is used in place of the mixing processor 103 and an injection extension unit 803 is used in place of the injection extension unit 105. The other construction is the same as shown in FIG. 1.

The hash value generating device 101a shown in FIG. 8 generates a hash value Hash 804 of 80 bits.

The mixing processor 801 is the same as the mixing processor 103 shown in FIG. 1 in that each of the message 2501 and the initial value 802 is divided into plural data blocks and both the blocks are mixed with each other, however, the specific processing of the mixing processor 801 is different from that of the mixing processor 103 because the mixing processor 801 uses the initial value 802 of 80 bits.

Figure 9:
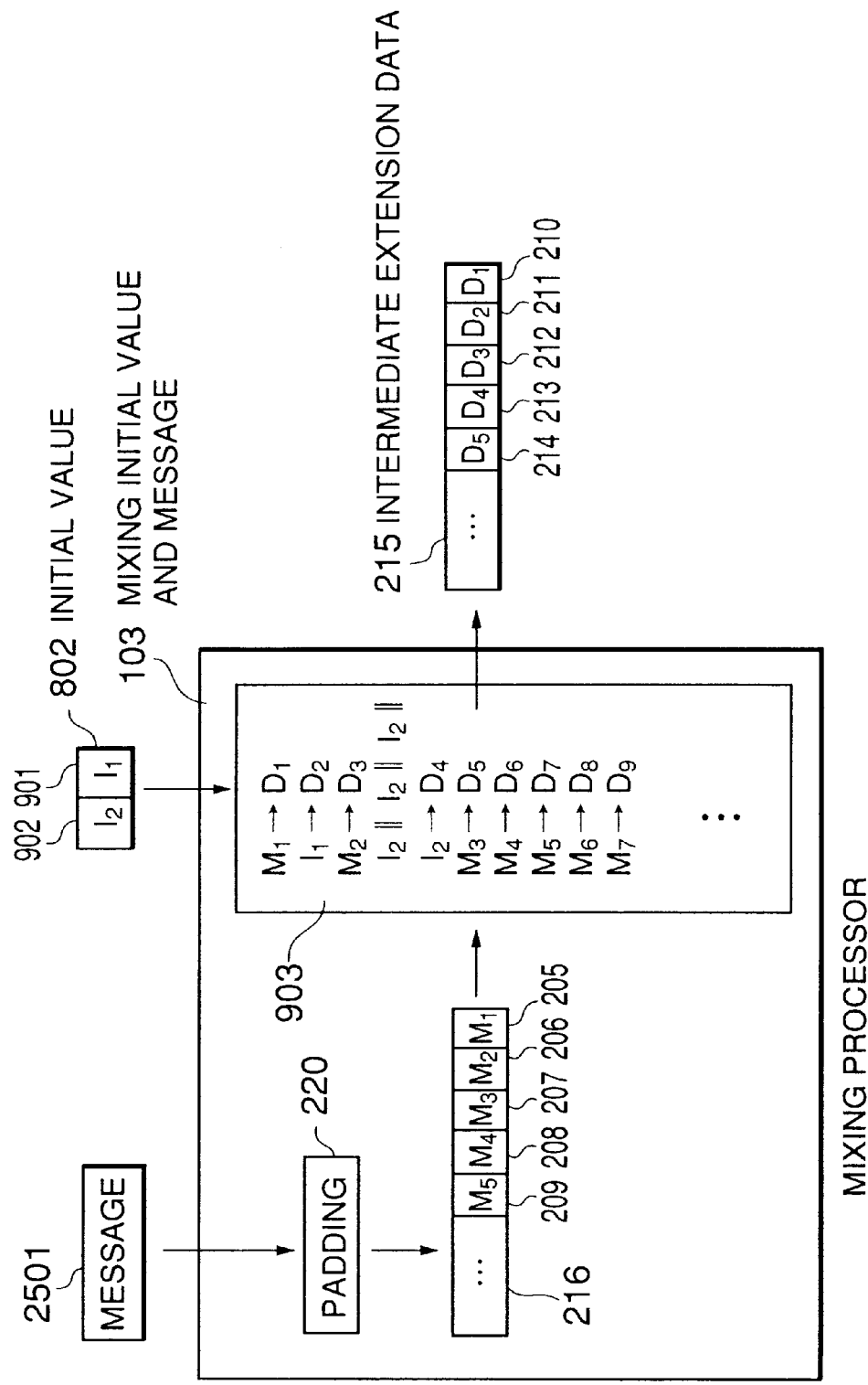
FIG. 9 is a diagram showing an example of processing in mixing processor 801 shown in FIG. 8.

FIG. 9 is a diagram showing an example of the processing in the mixing processor 801.

Here, the initial value 802 comprises a data block $I_1$ 901 of 64 bits and a data block $1_2$ 902 of 16 bits which are arranged in this order.

First, in the padding processor 220, the message 2501 is processed so that the sum of the length of the message 2501 and the length of the initial value 802 (80 bits) is set to an integral multiple of L×64. This processing is the same as the padding processing 220 in the mixing processor 103 shown in FIG. 2.

The message 2501 which is processed in the padding processor 220 so that the overall length thereof is set to an integral multiple of L×64 is converted to data 216 comprising 64-bit data blocks of N, $M_1$205, $M_2$206, $M_3$207, $M_4$208, $M_5$209, . . . which are arranged in this order.

Thereafter, in the processor 903, the 64-bit data blocks of N and the 64-bit data block $I_1$901 and the 16-bit data block $I_2$902 which constitute the initial value 802 are mixed with each other. Specifically, as shown in FIG. 9, the following data replacement is performed "$M_1 \rightarrow D_1$, $I_1 \rightarrow D_2$, $M_2 \rightarrow D_3$, $I_2\|I_2\|I_2I_2 \rightarrow D_4$, $M_3 \rightarrow D_5$, $M_4 \rightarrow D_6$, $M_5 \rightarrow D_7$, $M_6 \rightarrow D_8$, $M_7 \rightarrow D_9$, . . . ".

As a result of the replacement, a sequence of 64-bit data blocks N+2, $D_1$210, $D_2$311, $D_3$212, $D_4$213, $D_5$214, . . . which are arranged in this order are output as the intermediate extension data 215. The length of the intermediate extension data 215 is set to an integral multiple of L×64 bits.

The injection extension unit 803 is the same as the injection extension unit 105 shown in FIG. 1 in that the injection extension is performed while performing the character-substitution/transposition processing on the extension data 107 to be input to the injection extension unit 803. However, since the output (intermediate output) from the injection extension unit 803 is set to 80-bit data, the specific processing is different.

Figure 10:
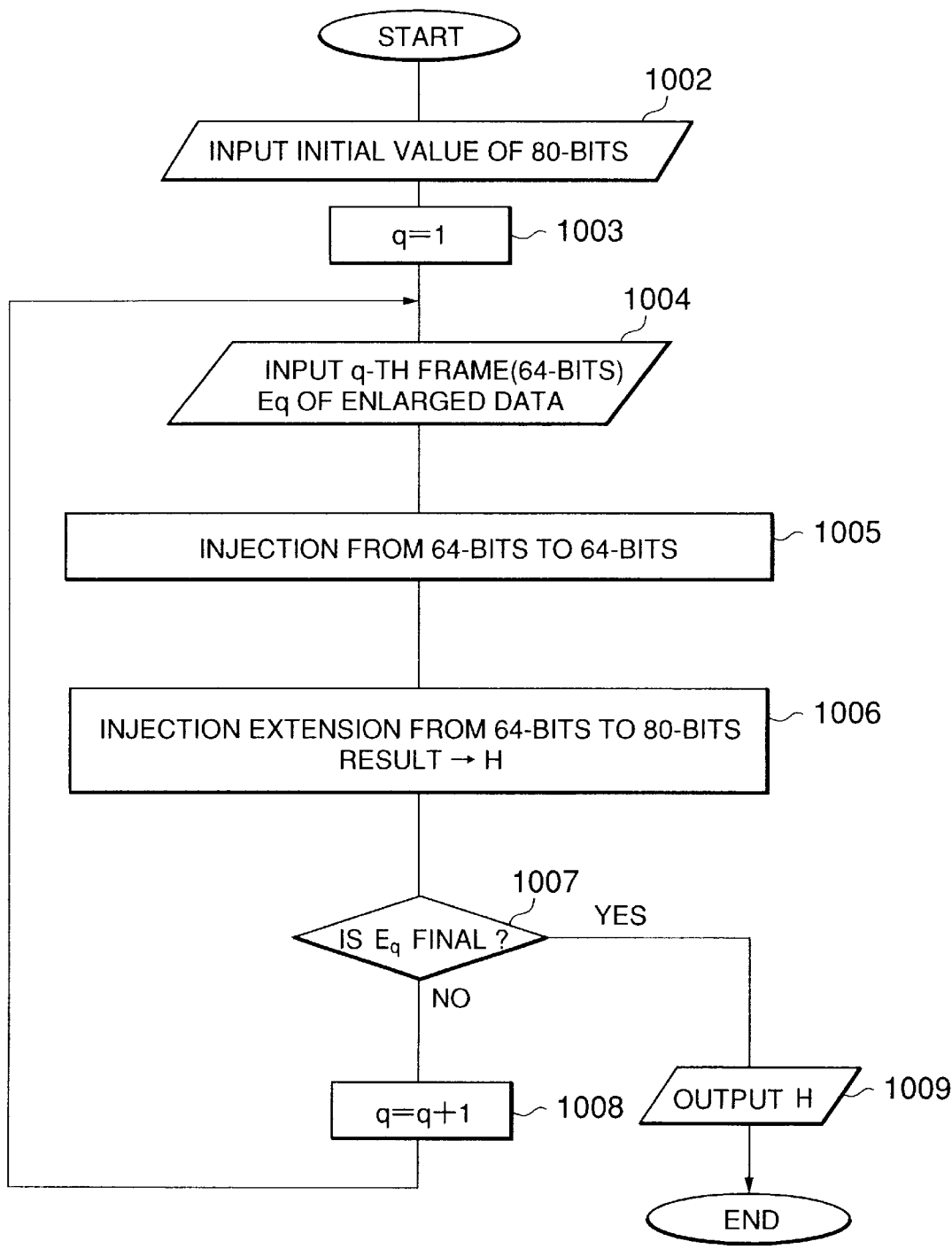
FIG. 10 is a flowchart showing an example of processing in injection extension unit 803 shown in FIG. 8.

FIG. 10 is a flowchart showing an example of the processing in the injection extension unit 803.

First, in step 1002, the initial value 802 of 80 bits is input, and then this value is set to H.

Subsequently, in step 1003, q is set to 1. Thereafter, in step 1004, a q-th frame $E_q$ of the extension data 107 of FIG. 8 is input.

Subsequently, in step 1005, the injection processing is carried out on the frame $E_q$ by using H as a parameter.

Subsequently, in step 1006, the injection extension processing is carried out on the data obtained in step 1005 by using H as a parameter so that the length of the data is extended from 64 bits to 80 bits. The 80-bit data thus obtained is set to H.

Subsequently, in step 1007, it is judged whether the q-th frame $E_q$ corresponds to the final frame of the frames $E_1$, $E_2$, ... which constitute the extension data 107. When it is the final frame, the process goes to step 1009, and if not so, the processing goes to step 1008.

In step 1008, the value of q is incremented by "1" (q=q+1), and then the processing returns to step 1004.

In step 1009, the 80-bit data H set in step 1006 is for the final frame of the frames constituting the extension data 107, so that H is output as the hash value Hash 804.

Subsequently, the extension processing in step 1005 of FIG. 10 and the injection extension processing in step 1006 will be described.

First, the injection processing (injection from 64 bits to 64 bits) in step 1005 of FIG. 10 will be described.

Figure 11:
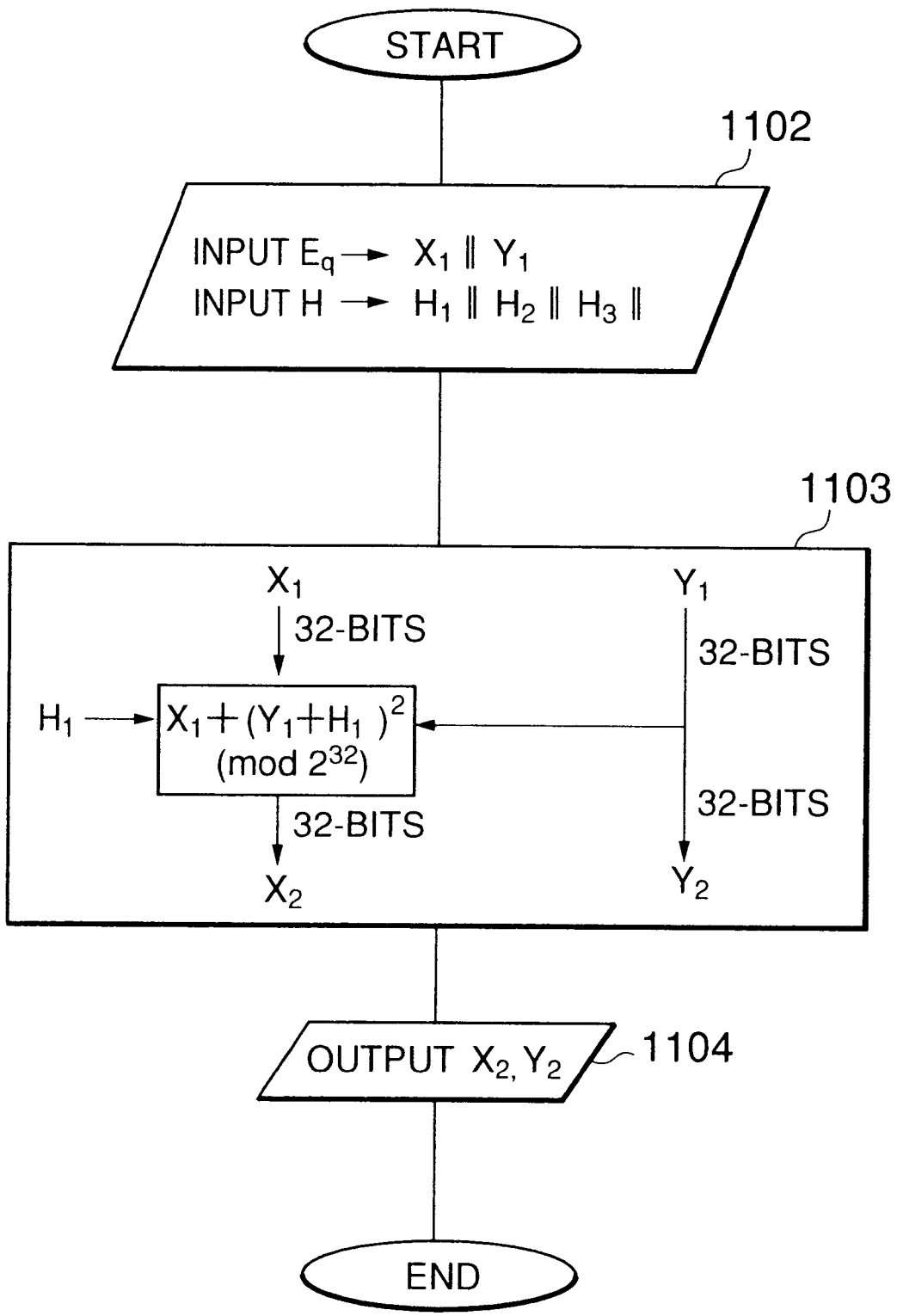
FIG. 11 is a flowchart showing an example of injection processing from 64-bit data to 64-bit data in step 1005 shown in FIG. 10.

FIG. 11 is a flowchart showing an example of the injection processing from 64-bit data to 64-bit data in step 1005 shown in FIG. 10.

First, in step 1102, the 64-bit frame $E_q$ in put in step 1004 of FIG. 10 is divided into upper 32-bit data $X_1$ and lower 32-bit data $Y_1$.

Further, the data H of 80 bits (the value set in step 1002 when the frame input in step 1004 is the first frame $E_1$, or the value set in step 1006 which is executed just before when the input frame is the second or subsequent frame $E_2$, ...) are divided into 32-bit data $H_1$, 32-bit data $H_2$ and 16-bit data $H_3$ from the head thereof.

Subsequently, in step 1103, $X_2$ and $Y_2$ are generated by performing the processing represented by the following equations:

$$X_2 = X_1 + (Y_1 + H_1)^2 \pmod{2^{32}}$$

$$Y_2 = Y_1$$

As a result, each of $X_2$, $Y_2$ becomes 32-bit data. In step 1103 of FIG. 11, the fine line arrow represents the flow of 32-bit data.

Thereafter, in step 1104, $X_2$ and $Y_2$ are output, and then the flow is ended.

As a result of the above flow, the frame $E_q$ comprising the 32-bit data $X_1$ and the 32-bit data $Y_1$ can be converted to the data of 64 bits in total which comprise the 32-bit data $X_2$ and the 32-bit data $Y_2$. Further, the injection relationship that given $X_2$, and $Y_2$, $X_1$ and $Y_1$ are uniquely determined from $X_1 = X_2 - (Y_2 + H_1)^2 \pmod{^{48}}$ and $Y_1 = Y_2$ can be established.

Accordingly, the injection processing from 64-bit data to 64-bit data can be performed by the above flow.

However, the processing of step 1005 of FIG. 10 is not limited to that of FIG. 11, and any processing may be used insofar as it performs the injection processing from 64-bit data to 64-bit data.

Next, the injection extension processing (injection extension from 64 bits to 80 bits) in step 1006 of FIG. 10 will be described.

Figure 12:
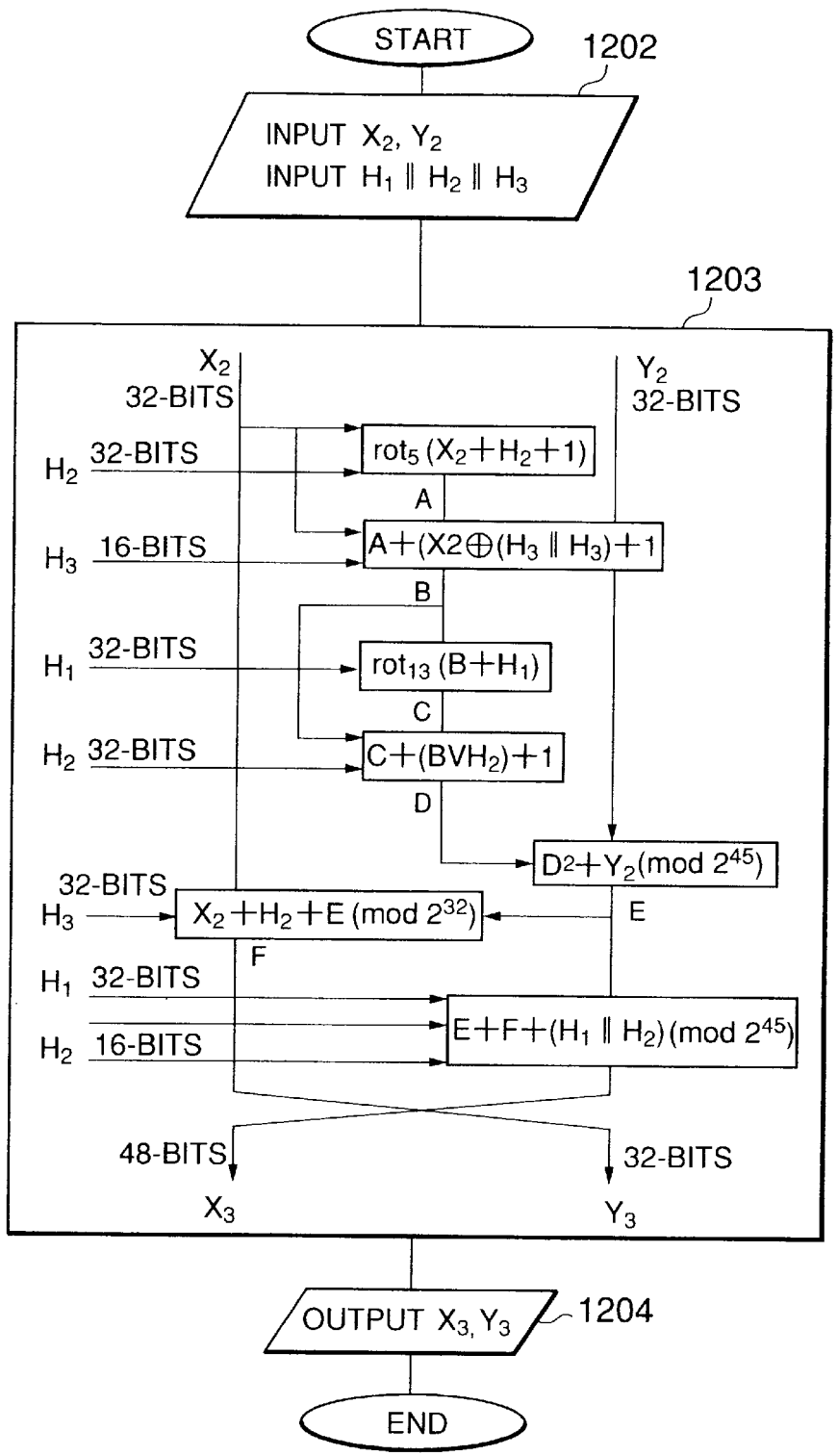
FIG. 12 is a flowchart showing an example of injection extension processing from 64-bit data to 80-bit data in step 1006 shown in FIG. 10.

FIG. 12 is a flowchart showing an example of the injection extension processing from 64-bit data to 80-bit data in step 1006 of FIG. 10.

First, in step 1202, the 32-bit data $X_2$, $Y_2$ generated in the flow of FIG. 11 are input. Further, the 32-bit data $H_1$, $H_2$ and the 16-bit data $H_3$ which are generated by dividing the 80-bit data H in step 1102 of FIG. 11 are input.

Subsequently, in step 1203, $X_3$, $Y_3$ are generated by successively performing the processing represented by the following equations:

$$A = \mathrm{rot}_5(X_2 + H_2 + 1)$$

$$B = A + X_2 \mathrm{eor}(H_3 \| H_3) + 1$$

$$C = \mathrm{rot}_{13}(B + H_1)$$

$$D = C + (B \text{ or } H_2) + 1$$

$$E = D^2 + Y_2 \pmod{2^{48}}$$

$$F = X_2 + H_3 + E \pmod{2^{32}}$$

$$X_3 = E + F + (H_1 \| H_2) \pmod{2^{48}}$$

$$Y_3 = F$$

Here, "or" represents logical OR every bit.

By successively performing the processing represented by the above equations, $X_3$ becomes 48-bit data and $Y_3$ becomes 32-bit data. In step 1203 of FIG. 12, the heavy line arrow represents the flow of 48-bit data, and the fine line arrow represents the flow of 32-bit data or 16 bit data.

Subsequently, in step 1204, $X_3$, $Y_3$ are output, and then the flow is ended.

As a result of the above flow, the data of 64 bits which comprise 32-bit data $X_2$ and 32-bit data $Y_2$ can be extended to the data of 80 bits in total which comprise 48-bit data $X_3$ and 32-bit data $Y_3$. In addition, the injection relationship which, $X_2$ and $Y_2$ are uniquely determined when given $X_3$ and $Y_3$ can be established.

Accordingly, the injection extension from 64-bit data to 80-bit data can be performed by the above flow.

However, the processing in step 1006 of FIG. 10 is not limited to that of FIG. 12, and any processing may be used insofar as it can perform the injection extended processing from 64-bit data to 80-bit data.

The first embodiment of the present invention has been described above.

Next, a second embodiment according to the present invention will be described.

Figure 13:
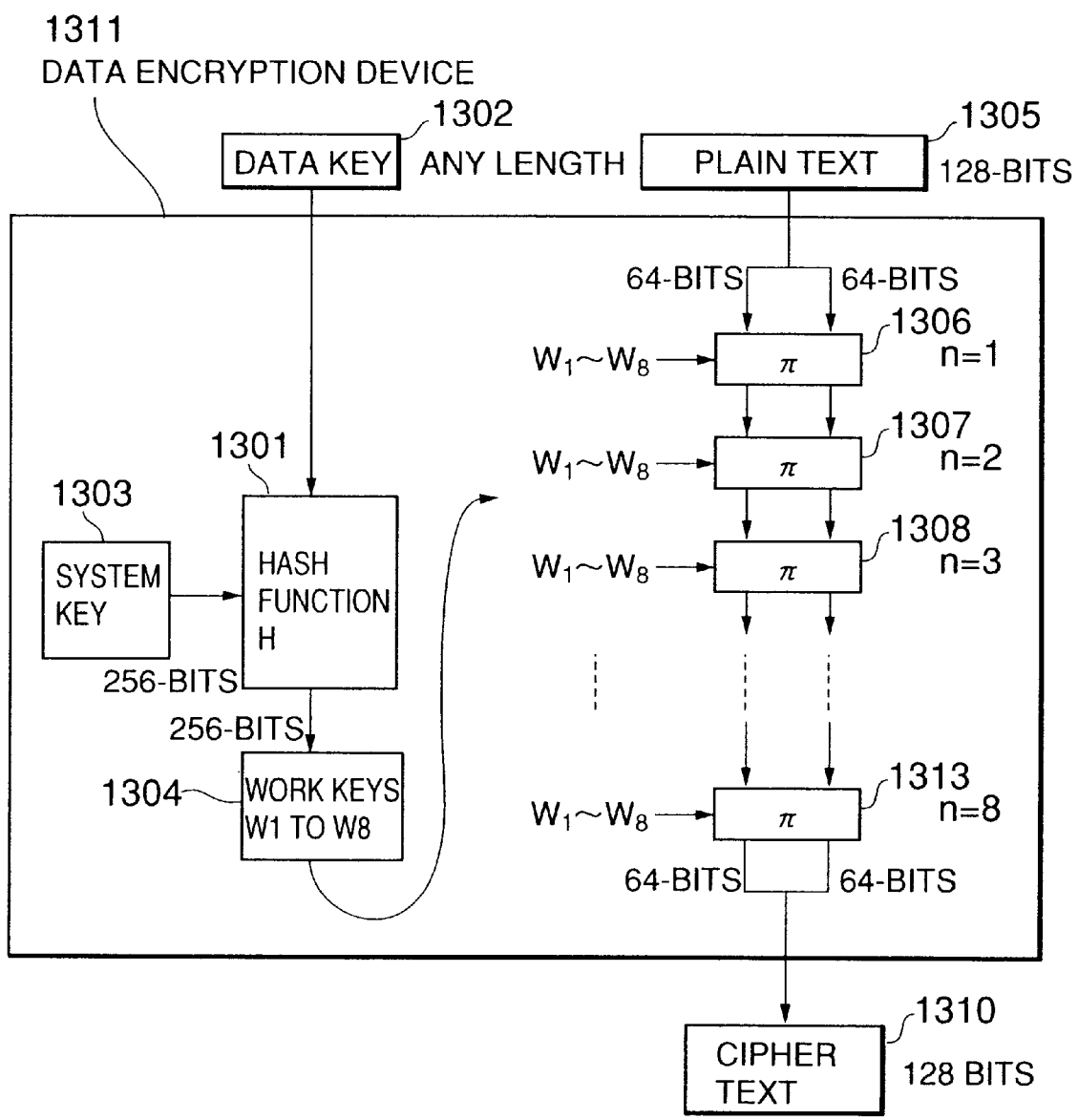
FIG. 13 is a diagram showing the functional constitution of a data encryption device according to a second embodiment of the present invention.

FIG. 13 is a diagram showing the functional constitution of the data encryption device according to a second embodiment of the present invention. As in the case of the hash value generating device of the first embodiment, a predetermined program is executed by a microprocessor in an information processing device having a microprocessor such as a personal computer, an IC card or the like, whereby the data encryption device can be implemented. Further, it may be implemented by only one LSI.

In FIG. 13, when a data key 1302 having any length is input to the data encryption device 1311, a system key 1303 of 256 bits is given as an initial value in the hash value generating device 1301, and a hash value of 256 bits for the data key 1302 is generated. This hash value is set as a work key 1304.

The work key 1304 is divided into eight 32-bit data $W_1$, $W_2$, ..., $W_8$.

Here, the hash value generating device 1301 may be that used in the first embodiment, or the conventional "hash function using block encryption" or "special-purpose block function".

Further, when plain text 1305 of 128 bits which is an encryption target is input to the data encryption device 1311, the plain text 1305 is divided into two items of 64-bit data, and input to a π-function processing unit 1306.

The data input to the π-function processing unit 1306 are converted to two 64-bit data (as described later) by using eight 32-bit data $W_1, W_2, \ldots, W_8$ as a key and then input to the π-function processor 1307. Thereafter, in the same manner as the processing in the π-function processor 1306, the input data are converted to two 64-bit data.

Thereafter, the above processing is successively performed in the π-function processors 1308 to 1313, thereby outputting two 64-bit data from the π-function processor 1313. These two 64-bit data are coupled, and encrypted text 1310 of 128 bits is generated.

Next, the processing in the π-function processors 1306 to 1313 shown in FIG. 13 will be described.

The π-function processors 1306 to 1313 perform the character-substitution/transposition processing on the two input 64-bit data by using the work key 1304 as a parameter. However, unlike the encryption function such as DES which has been hitherto used for the conventional character-substitution/transposition processing, the π-function processors 1306 to 1313 of this embodiment contain the processing for multiplying the two 32-bit data and the result of the 32-bit cyclic shift calculation.

Figure 14:
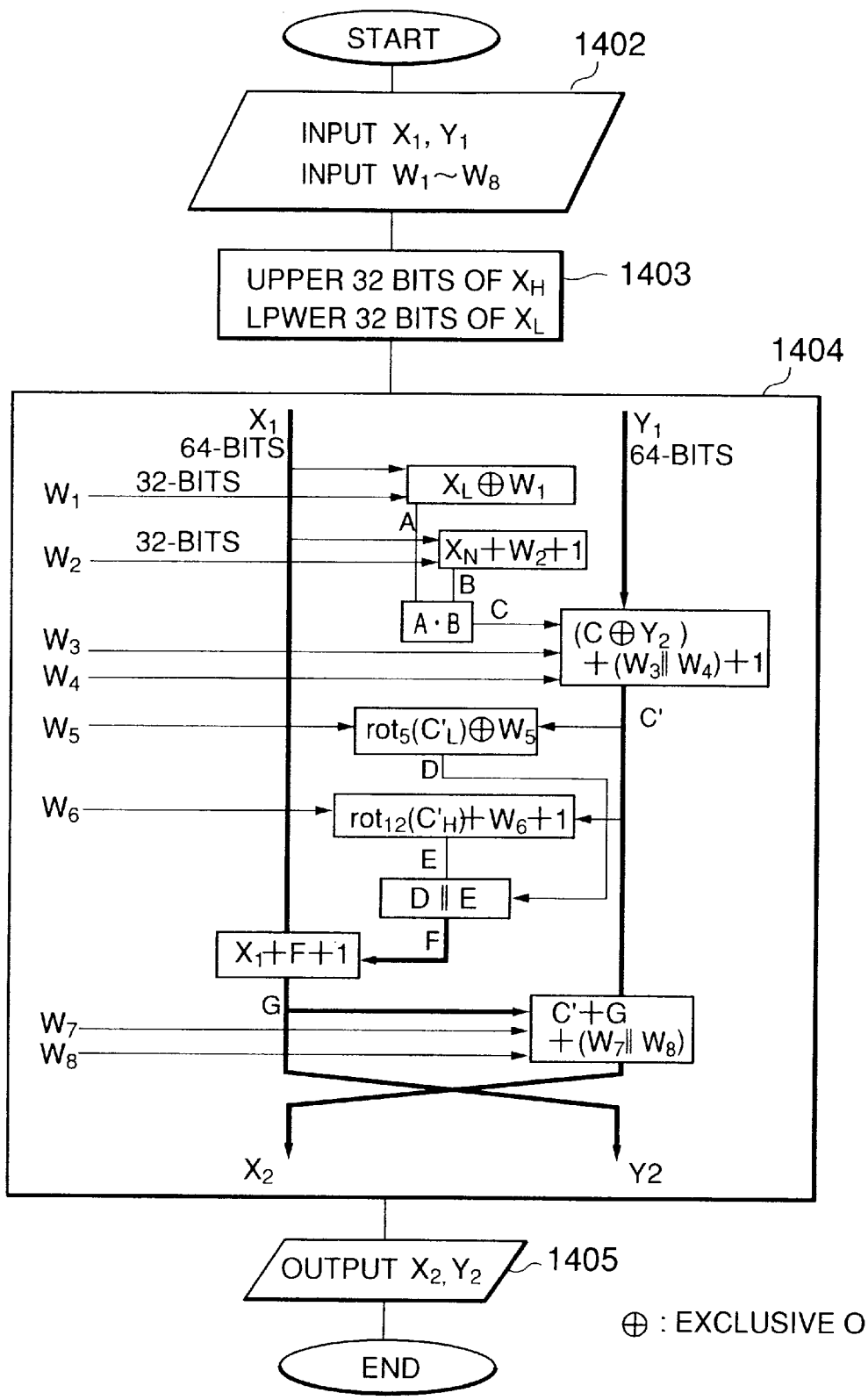
FIG. 14 is a flowchart showing an example of processing in π function processors 1306 to 1313 shown in FIG. 13.

FIG. 14 shows an example of the processing in the π-function processors 1306 to 1313.

First, in step 1402, two 64-bit data $X_1$, $Y_1$ (the data obtained by dividing 128 bits of a plain text in the π-function processor 1306, and the data output from the immediately preceding π-function processor in the π-function processors 1307 to 1313) are input. Further, the eight 32-bit data $W_1$ to $W_8$ constituting the work key 1304 are input.

Subsequently, in step 1403, the 64-bit data $X_1$ input in step 1402 is divided into upper 32-bit data $X_H$ and lower 32-bit data $X_L$.

Subsequently, in step 1404, $X_2$, $Y_2$ are generated by successively performing the processing indicated by the following equations:

$A = X_L \text{ eor } W_1$ $B = X_H + W_2 + 1$ $C = A \cdot B$ $C' = (C \text{ eor } Y_2) + (W_3 \| W_4) + 1$ $C'_H \| C'_L = C'$ $D = \text{rot}_5(C'_L) \text{ eor } W_5$ $E = \text{rot}_{12}(C'_H) + W_6 + 1$ $F = D \| E$ $G = X_1 + F + 1$ $X_2 = C' + G + (W_7 \| W_8)$ $Y_2 = G$ By successively performing the processing indicated by the above equations, each of $X_2$ and $Y_2$ becomes 64-bit data. In step 1404 of FIG. 14, the heavy line arrow represents the flow of the 64-bit data, and the fine line arrow represents the flow of 32-bit data.

Next, in step 1405, $X_2$ and $Y_2$ are output, and then this flow is ended.

As a result of the above flow, the data of 128 bits in total which comprise 64-bit data $X_1$, $Y_1$ can be converted to the data of 128 bits in total comprising 64-bit data $X_2$, $Y_2$ by performing the character-substitution/transposition.

Further, the conversion processing from $X_1 \| Y_1$ to $X_2 \| Y_2$ may be set to bijection. That is, there exists a $\pi^{-1}$-function which can perform inverse conversion from the output $X_2 \| Y_2$ to the input $X_1 \| Y_1$.

Specifically, $X_1$, $Y_1$ can be calculated from $X_2$, $Y_2$ by successively carrying out the processing indicated by the following equations:

$G = Y_2$ $C' = X_2 - G - (W_7 \| W_8)$ $C'_H \| C'_L = C'$ $D = \text{rot}_5(C'_L) \text{ eor } W_5$ $E = \text{rot}_{12}(C'_H) + W_6 + 1$ $F = D \| E$ $X_1 = G - F - 1$ $X_H \| X_L = X_2$ $A = X_L \text{ eor } W_1$ $B = X_H + W_2 + 1$ $C = A \cdot B$ $Y_1 = (C' - (W_3 \| W_4) - 1) \text{ eor } C$ Since $X_1$ and $Y_1$ can be calculated by successively carrying out the processing indicated by the above equations, the cipher text 1310 which is generated by the data encryption device 1311 can be decrypted to the original plain text 1305 by the inverse conversion using $\pi^{-1}$-function.

The processing in the π-function processors 1306 to 1313 shown in FIG. 13 is not limited to that shown in FIG. 14, and any processing may be used insofar as it contains the multiplication processing between two 32-bit data and the cyclic shift calculation of 32-bit data when the character=substitution/transposition of the bijection is carried out.

According to the second embodiment of the present invention, during the process of encrypting the plain text 1305 using the work key 1304, the multiplication processing for the two 32-bit data (processing $C = A \cdot B$ in step 1404 of FIG. 14) in the π-function processors 1306 to 1313 is carried out for performing the character-substitution/transposition processing. In addition, the cyclic shift calculation on 32-bit data is also performed (the processing $D = \text{rot}_5(C'_L)$ eor $W_5$, $E = \text{rot}_{12}(C'_H) + W_6 + 1$ in step 1404 of FIG. 14.)

With the above question, an cipher text having a high degree of data scrambling can be more quickly generated than when an encryption function such as DES or the like is used for the character-substitution/transposition processing as described above.

In the second embodiment, as shown in FIG. 13, the processing in the π-function processor is carried out at eight times (n=8). However, the present invention is not limited to this manner, For example, the value of n may be given from the external, whereby n can be varied to any positive integer.

The second embodiment of the present invention has been described above.

Next, a third embodiment according to the present invention will be described.

Figure 15:
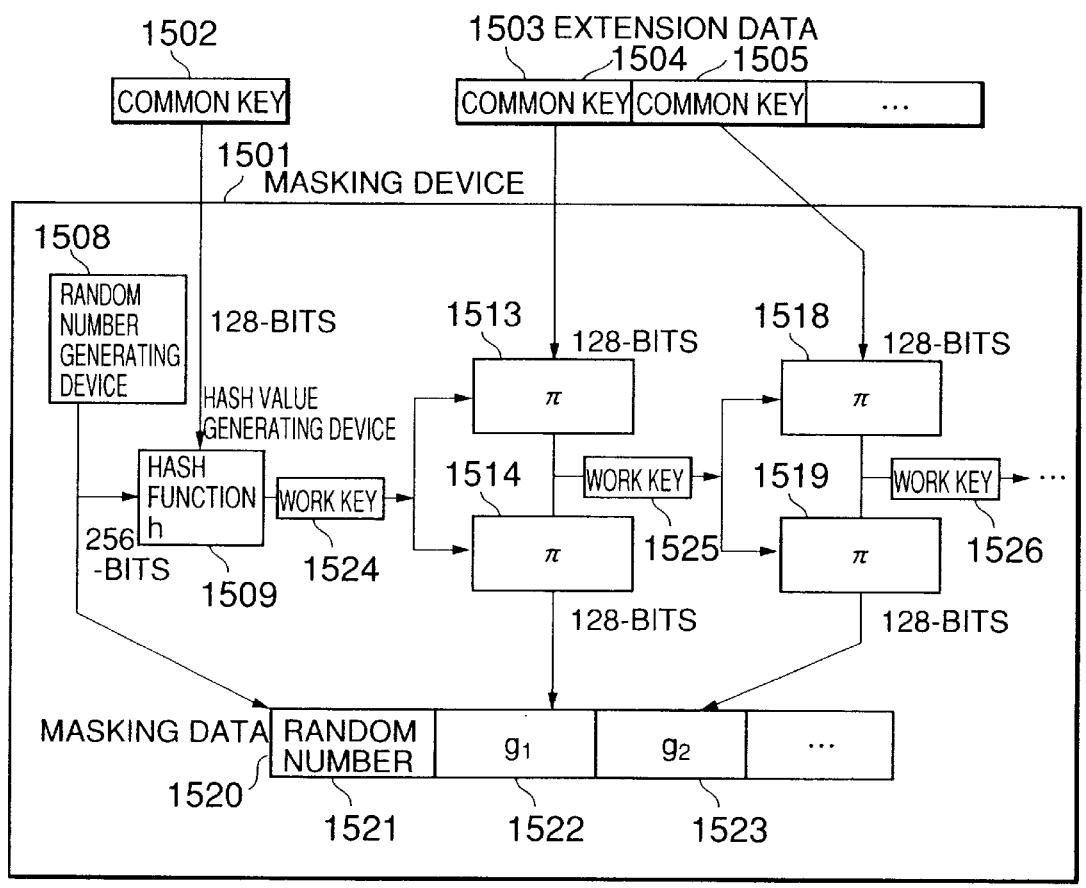
FIG. 15 is a diagram showing the functional constitution of a masking device according to a third embodiment of the present invention.

FIG. 15 is a diagram showing the functional constitution of a masking device according to a third embodiment of the present invention. Here, the masking device is defined as a device for generating data to mask (cover and hide) data. The data generated by the masking device may be used as a key for encrypting data.

The masking device of this embodiment can be implemented by making a microprocessor execute a predetermined program in an information processing device having a microprocessor such as a personal computer, an IC card or the like as in the case of the hash value generating device of the first embodiment. Further, it may be implemented by only one LSI.

In FIG. 15, when a common key 1502 of 128 bits and extension data 1503 comprising 128-bit common keys of N which are linked to one another are input to the masking device 1501, a hash value of 128 bits for data which are obtained by linking a random number 1521 generated in a random number generating device 1508 and the input common key 1502 is generated in a hash value generating device 1509. This hash value is set as a work key 1524 for encrypting a first section 1504 which is a first 128-bit data of the extension data 1503. Further, the random number 1521 generated in the random number generating device 1503 is set as a first data of the masking data 1520.

Here, as the hash value generating device 1302 may be used that of the first embodiment, or the conventional "hash function using block encryption" or "special-purpose block function".

In a π-function processor 1513, the first section 1504 of the extension data 1503 is subjected to the character-substitution/transposition using a part of the work key 1524 as a parameter to be converted to 128-bit data. Thereafter, in the π-function processor 1514, the 128-bit data generated in the π-function processor 1513 is subjected to the character-substitution/transposition using a part of the work key 1524 as a parameter to be converted to 128-bit data. This data is set a second data $g_1$ 1522 of the masking data 1520. Further, the 128-bit data generated in the π-function processor 1513 is set as a work key 1525 for encrypting a second section 1505 which is a second 128-bit data of the extension data 1503.

Further, in a π-function processor 1518, the second section 1505 of the extension data 1503 is subjected to the character-substitution/transposition using a part of the work key 1525 as a parameter to be converted to 128-bit data. Thereafter, in a π-function processor 1519, the 128-bit data generated in the π-function processor 1518 is subjected to the character-substitution/transposition using a part of the work key 1525 as a parameter to be converted to 128-bit data. This data is set as a third data $g_2$ 1523 of the masking data 1520. Further, the 128-bit data generated in the π-function processor 1518 is set as a work key 1526 for encrypting a third section (not shown) which is a third 128-bit data of the extension data 1503.

The above processing is performed on all the sections (128-bit data) constituting the extension data 1503 to generate the masking data 1520.

Here, in the masking device 1501 shown in FIG. 15, the π-function processors 1513, 1514, 1518, 1519, . . . are the same as the π-function processors 1306 to 1313 used in the second embodiment shown in FIG. 13.

Accordingly, according to the third embodiment of the present invention, mask data having higher degree of data scrambling can be more quickly generated as compared with the case where the encryption function such as DES or the like is used for the character-substitution/transposition processing.

In the third embodiment of the present invention, the masking data 1520 can be regarded as data for which the common key 1502 is extended. Further, the masking data 1520 can be also regarded as data for which the extended data 1503 are encrypted by the common key 1502. That is, by performing the processing which is inverse to the processing of FIG. 15, the extension data 1503 can be encrypted from the common key 1502 and the masking data 1520.

In the third embodiment of the present invention, the length of the common key 1502 is set to 128 bits. However, the present invention is not limited to this embodiment. Further, the processing in the π-function processor is carried out twice on each of the sections 1504, 1505, . . . of the extension data 1503, however, the present invention is not limited to this embodiment.

The third embodiment of the present invention has been described above.

Next, a fourth embodiment according to the present invention will be described.

This embodiment relates to a data encryption/decryption system for electronic mails, etc., and contains a data encryption device and a data decrypting device. Like the hash value generating device of the first embodiment, the data encryption device and the data decryption device which will be described below can be implemented by making a microprocessor execute a predetermined program in an information processing device having a microprocessor such as a personal computer, an IC card or the like, and it may be also implemented by only one LSI.

First, the data encryption device will be described.

Figure 16:
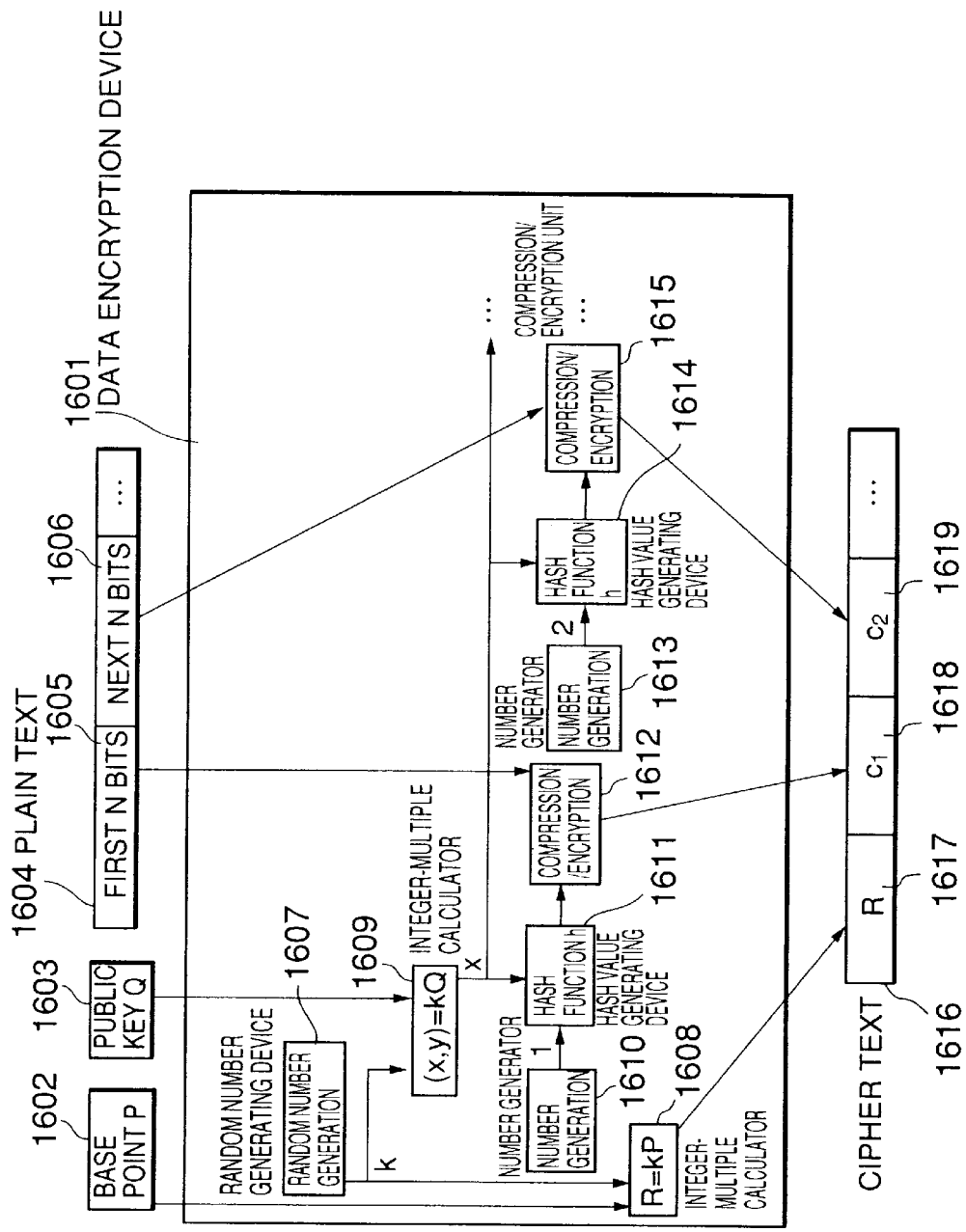
FIG. 16 is a diagram showing the functional constitution of a data encryption device which constitutes a data encryption/decryption system according to a fourth embodiment of the present invention.

FIG. 16 is a diagram showing the functional constitution of the data encryption device which constitutes the data encryption/decryption system according to the fourth embodiment of the present invention.

A base point P 1602 serving as a parameter in an elliptical curve cipher, a public key Q 1603 and a plain text 1604 are input to the data encrypting device 1601 shown in FIG. 16.

Here, the elliptical curve cipher is a public key encryption which is executed by defining an addition calculation $(x_1, y_1)+(x_2, y_2)$ or an integer-multiple calculation $k(x_1, y_1)$, etc. of two points $(x_1,y_1)$, $(x_2,y_2)$ on an elliptical curved line which is represented by the following equation:

$$Y^2 = x^3 + ax + b$$

The base point P 1602 and the public key Q 1603 are points on the elliptical curved line, and it satisfies the following relationship with a secret key d 1802 as described later:

$$Q = dP$$

The base point P input to the data encryption device 1601 is input to the integer-multiple calculator 1608 together with a random number k generated in the random number generating device 1607. In response to this, the integer-multiple calculator 1608 performs the processing represented by the following equation to generate data R 1617:

$$R = kP$$

The data R 1617 is the first data of the encrypted text 1616.

The public key Q 1603 input to the data encryption device is input to the integer-multiple calculator 1609 together with a random number k generated in the random generating device 1607, and in response to this, the integer-multiple calculator 1609 performs the processing represented by the following equation to generate a point $(x,y)$ on the elliptical curved line.

$$(x,y) = kQ$$

The first N-bit data 1605 of the plain text 1604 which is input to the data encryption device 1601 is input to the compression/encryption unit 1612. In response to this, the compression/encryption unit 1612 performs the compression/encryption processing of the first N-bit data 1605 by using as a key the hash value generated in the hash value generating device 1611, thereby generating the data $C_1$ 1618. This data $C_1$ 1618 is set as the second data of the cipher text 1616.

The hash value generating device 1611 generates a hash value for data which are obtained by connecting a sequence number "1" generated in a number generator 1610 and a numerical value x of (x,y) generated in the integer-multiple calculator 1609.

Further, the second N-bit data 1606 of the plain text 1604 input to the data encryption device 1601 is input to the compression/encryption unit 1615. In response to this, the compression/encryption unit 1615 performs the compression/encryption processing of the second N-bit data 1606 by using as a key the hash value generated in the hash value generating device 1614, thereby generating data $C_2$ 1619. This data $C_2$ 1619 is set as the third data of the cipher text 1616.

The hash value generating device 1614 generates a hash value for data which are obtained by connecting the sequence number "2" generated in the number generator 1613 and the numerical value x of (x,y) generated in the integer-multiple calculator 1609.

The above processing is performed on all the N-bit data constituting the plain text 1604 to generate the cipher text 1616.

In the data encryption device 1601 shown in FIG. 16, each of the hash value generating devices 1611, 1614, ... may be those of the first embodiment, or the conventional "hash function using block encryption" or "special-purpose block function".

Next, the processing of the compression/encryption unit 1612, 1615, ... shown in FIG. 16 will be described.

Figure 17:
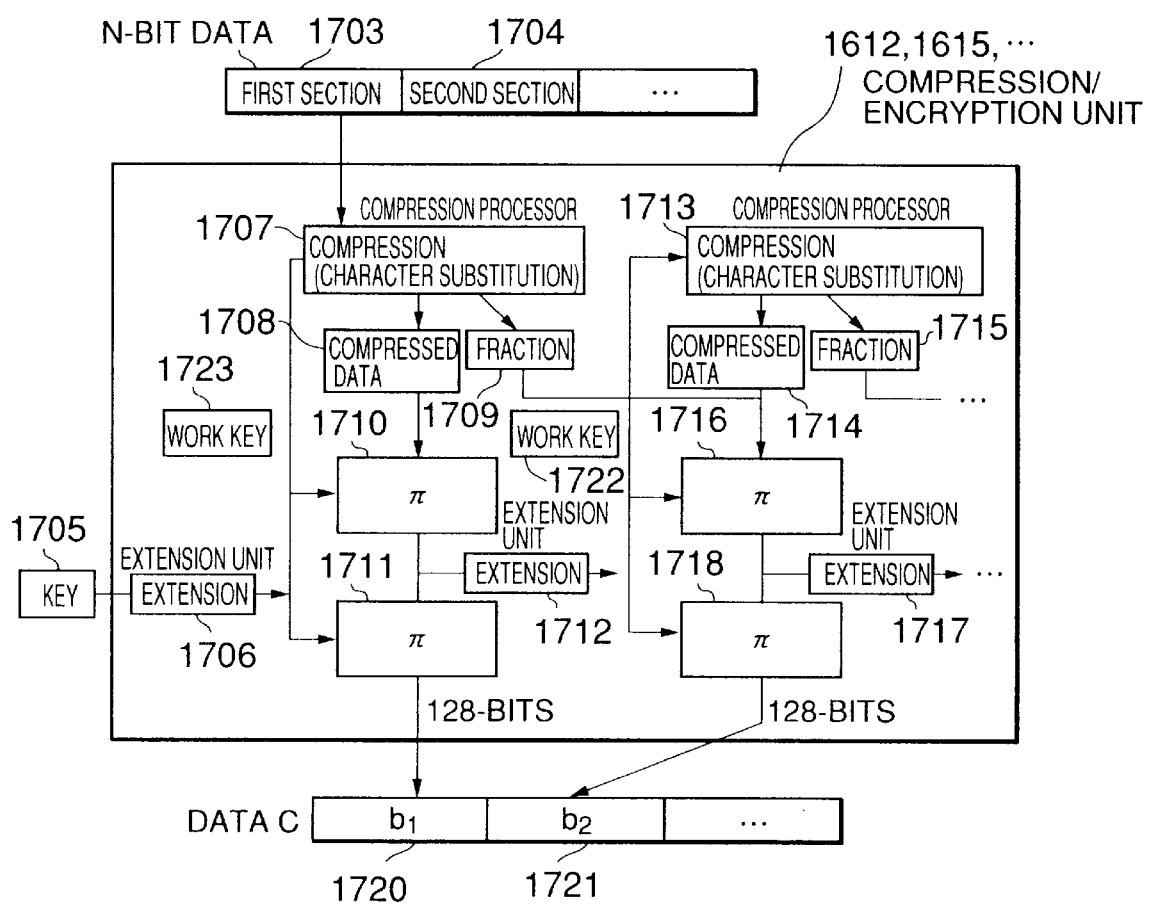
FIG. 17 is a diagram showing the functional constitution of compression/encryption units 1612, 1615, . . . shown in FIG. 16.

FIG. 17 is a diagram showing the functional constitution of the compression/encryption units 1612, 1615, ... shown in FIG. 16.

Here, the N-bit data correspond to the N-bit data 1605, 1606, ... constituting the plain text 1604 in FIG. 16. The data C represent the data $C_1$ 1618, $C_2$ 1619, ... which are generated by the compression/encryption units 1612, 1615, ... in FIG. 16. Further, a key 1705 corresponds to the hash value generated by the corresponding hash value generating device 1611, 1614, ... in FIG. 16.

In FIG. 17, when the key 1705 is input, an extension unit 1706 receives this key 1705 to generate plural copies of the key 1705, and link these copies to generate a work key 1723.

The first section 1703 which is a first data section of the N-bit data is subjected to compression (character substitution) processing such as Haffman compression or the like by using a part of the work key 1723 as a parameter in the compressor processor 1707, and the compression result is output as 128-bit compressed data 1708 and fraction data 1706.

The 128-bit compressed data 1708 are subjected to the character-substitution processing using a part of the work key 1723 to be converted to 128-bit data in the π-function processor 1710. The processed data are further subjected to the character-substitution/transposition using a part of the work key 1723 as a parameter to be converted 128-bit data in the π-function processor 1711. This data are set as the first data $b_1$ 1720 of the data C to be generated. The 128-bit data generated in the π-function processor 1710 is input to the extension unit 1712, and plural copies are generated therefrom. These copies are linked to one another to generate a work key 1722 for encrypting the second section 1704 which is a second data section of the N-bit data.

The second section 1704 which is the second data section of the N-bit data is subjected to the compression (character substitution) processing using a part of the work key 1722 as a parameter by the Haffman compression or the like, and the result is output as compressed data 1714 and fraction data 1715. Here, the compressed data 1714 is generated so that the total bit length of the bit length thereof and the bit length of the fraction data 1709 generated when the first section 1703 is subjected to the compression (character substitution) processing becomes 128 bit.

The compressed data 1714 is linked to the fraction data 1709 generated when the first section 1703 is subjected to the compression (character substitution) processing, thereby generating the 128-bit data. Thereafter, in a π-function processor 1716, the data is subjected to the character-substitution/transposition processing using a part of the work key 1722 as a parameter in the π-function processor 1716 to be converted to 128-bit data. Thereafter, in a π-function processor 1718, the processing result is further subjected to the character-substitution/transposition processing using a part of the work key 1722 as a parameter to be converted to 128-bit data. This data is set as a second data $b_2$ 1721 of the data C to be generated. Further, the 128-bit data generated in the π-function processor 1716 is input to an extension unit 1717 to generate plural copies of the 128-bit data. These copies are linked to one another to generate a work key for encrypting a third data section of the N-bit data.

By performing the above processing on all the sections constituting the N-bit data, the corresponding data C is generated.

Here, the π-function processors 1710, 1711, 1716, 1718, ... shown in FIG. 17 are the same as the π-function processors 1306, 1307, 1308, ... 1313 used in the second embodiment shown in FIG. 13.

According to the data encryption device which constitute the data encryption/decryption system of the fourth embodiment of the present invention, the data encryption is performed by combining the elliptical curved-line cipher and the hash value generating device. In addition, the π-function processor used in the second embodiment is used as the compressing/encryption unit.

Accordingly, according to the data encryption device which constitute the data encryption/decryption system of the fourth embodiment of the present invention, as compared with the conventional public key cipher type data encryption device such as RSA (Riverst, Shamir, Adleman), cipher text having higher degree of scrambling can be more quickly generated for longer data.

The data encryption device of this embodiment is the same as the data encryption device using the conventional public key cipher system of RSA in that plain text 1604 is converted to encrypted text 1616 by using the public key Q1603. However, the data encryption device of the fourth embodiment of the present invention is different from the conventional system in that the character-substitution/transposition is performed by using the π-function processor.

Further, the compression (character substitution) processing is performed by the Haffman compression, etc. in the compression processors 1701, 1713, ... , and thus with respect to normal plain text which can be compressed by the Haffman compression, etc, the length of the cipher text 1616 is set to be shorter than the length of the plain text 1604. In this point, this embodiment is also different from the prior arts.

In the compressing/encryption units 1612, 1615, . . . as shown in FIG. 17, the conversion processing on each section (the first section 1703, the second section 1704, . . . ) constituting the N-bit data in the π-function processor is carried out twice. However, the present invention is not limited to this embodiment.

Next, a data decryption device will be described.

Figure 18:
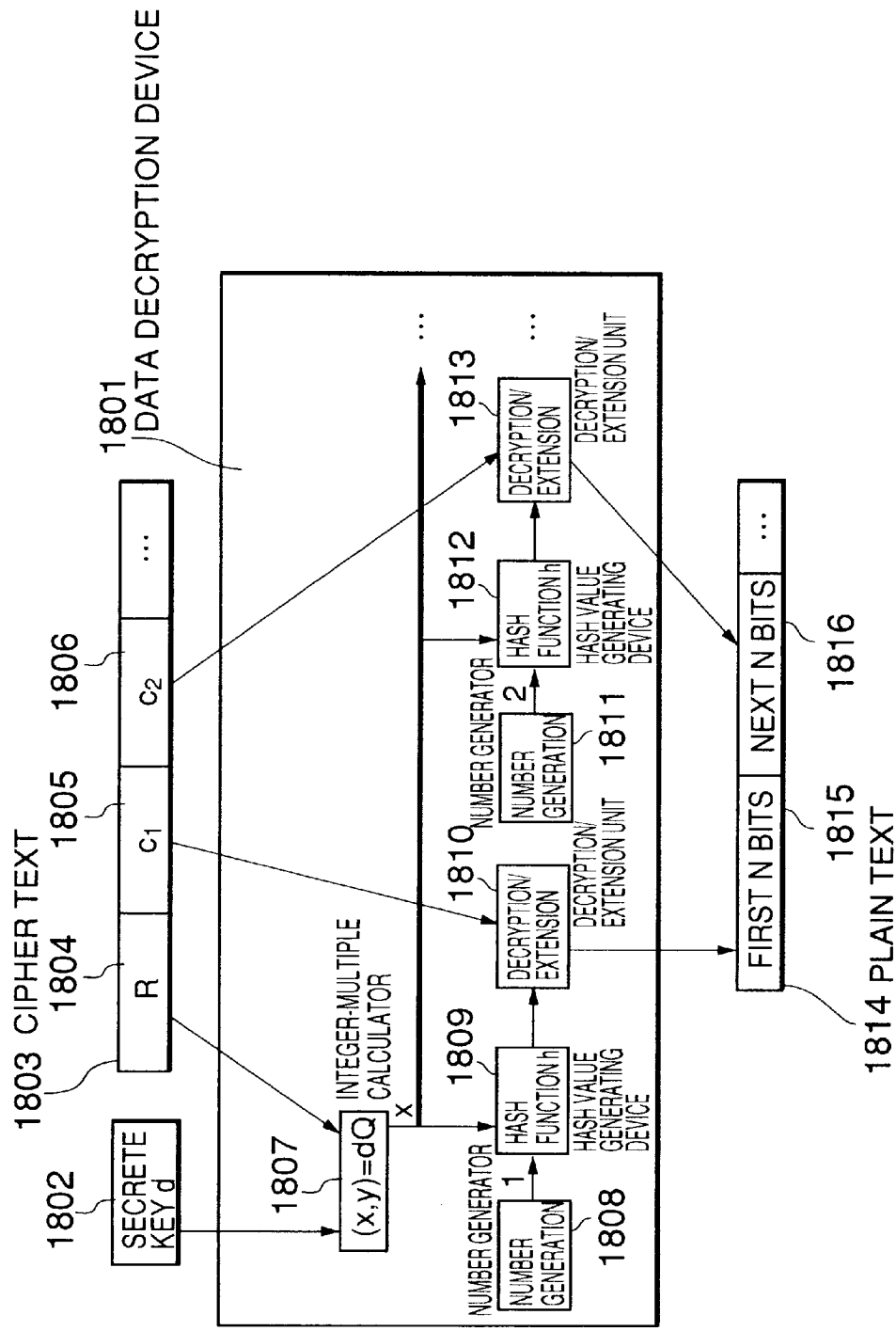
FIG. 18 is a diagram showing the functional constitution of a data decryption device which constitutes the data encryption/decryption system according to the fourth embodiment of the present invention.

FIG. 18 is a diagram showing the functional constitution of the data decryption device constituting the data encryption/decryption system according to the fourth embodiment of the present invention.

To the data decryption device 1801 shown in FIG. 18 are input a secret key d 1802 serving as a parameter in the elliptical curved-line cipher, and a cipher text 1803.

The secret key d 1802 which is input to the data decryption device 1801 is input to an integer-multiple calculator 1807 together with the first data R 1804 (corresponding to the data R 1617 in FIG. 16) of the cipher text 1803 input to the data decryption device 1801. In response to this, the integer-multiple calculator 1807 performs the processing indicated by the following equations to generate a point (x,y) on the elliptical curved line:

$$(x,y)=dR$$

The second data $C_1$ 1805 of the cipher text 1803 input to the data decryption device 1801 is input to a decryption/extension unit 1810. In response to this, the decryption/extension unit 1810 performs the decryption/extension processing of the second data $C_1$ 1805 by using as a key the hash value generated in the hash value generating device 1809, thereby generating N-bit data. This data is set as the first N-bit data 1815 of the plain text 1814.

The hash value generating device 1809 generates a hash value for data obtained by connecting the sequence number "1" generated in a number generator 1808 and the numerical value x of (x,y) generated in an integer-multiple calculator 1807.

The third data $C_2$ 1806 of the encrypted text 1803 input to the data decryption device 1801 is input to a decryption/extension unit 1813. In response to this, the decryption/extension unit 1813 performs the decryption/extension processing of the third data $C_2$ 1806 by using as a key the hash value generated in the hash value generating device 1812, thereby generating N-bit data. This data is set as the second N-bit data 1816 of the plain text 1814.

The hash value generating device 1812 generates a hash value for data obtained by connecting the sequence number "2" generated in a number generator 1811 and the numerical value x of (x,y) generated in the integer-multiple calculator 1807.

The above processing is performed on the second data $C_1$ 1805 up to the final data, which constitute the cypher text 1803, thereby generating the plain text 1814.

In the data decryption device 1801 shown in FIG. 18, the hash values generating device 1809, 1812, . . . are the same as shown in FIG. 16.

Next, the processing in the decryption/extension units 1810, 1813, . . . shown in FIG. 18 will be described.

Figure 19:
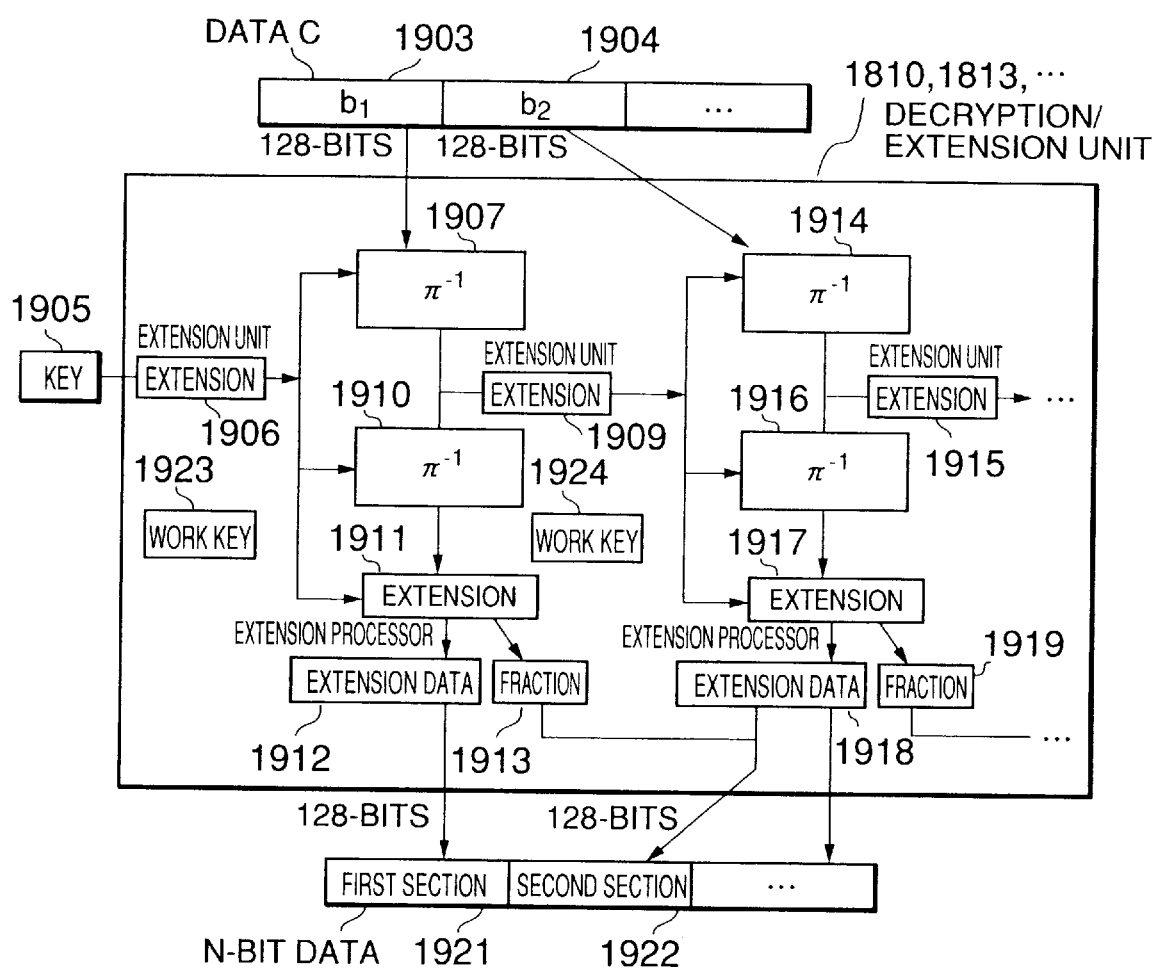
FIG. 19 is a diagram showing the functional constitution of decryption/extention units 1810, 1812, . . . shown in FIG. 18.

FIG. 19 is a diagram showing the functional constitution of the decryption/extension unit 1810, 1813, . . . shown in FIG. 18

Here, the data C represent the second and subsequent data of the cypher text 1803 ($C_1$ 1805, $C_2$ 1806, . . . ) in FIG. 18. Further, the N-bit data corresponds to the N-bit data 1815, 1816, . . . which are generated by the decryption/extension units 1810, 1813, . . . in FIG. 18. Further, the key 1905 corresponds to a hash value which is generated by the corresponding hash value generating device 1809, 1812, . . . in FIG. 18.

Further, the $\pi^-$-function processor 1907, 1910, 1914, 1916, . . . performs the processing which establishes the inverse function relationship with the processing in the π-function processor 1710, 1711, 1716, 1718, . . . shown in FIG. 17. That is, the $\pi^{-1}$-function corresponds to the inverse function of the π-function.

In the case where the same parameter is set to the π-function and the $\pi^{-1}$-function, if data π (m) which are obtained by converting data m with the π-function is further converted by the $\pi^{-1}$-function, the result is the original data m. That is, the $\pi^{-1}$-function and the π-function satisfy the following equation:

$$M=\pi^{-1}(\pi(m))$$

Further, the extending processor unit 1911, 1917, . . . performs the processing which has the inverse-conversion relationship with the processing in the compression processor 1707, 1713, . . . shown in FIG. 17.

In the case where the same parameter is set to the compression processor and the extension processor, if data which are obtained by subjecting the data m to the compression (character-substitution) processing is further converted by the extension (character-substitution) processing, the original data m are obtained.

In FIG. 19, when the key 1905 is input, the extension unit 1906 receives the key 1905 to generate plural copies thereof, and links these copies to generate a work 1923.

The first 128-bit data $b_1$ 1903 of the data C is subjected to the character-substitution/transposition processing to be converted to 128-bit data by using a part of the work key 1923 as a parameter in the $\pi^{-1}$-function processor 1907, and then further subjected to the character-substitution/transposition processing to be converted to 128-bit data by using a part of the work key 1923 as a parameter in the $\pi^{-1}$-function processor 1910.

In the extension processor 1911, the output result of the $\pi^{-1}$-function processor 1910 is subjected to the extension (character-substitution) processing by using a part of the work key 1923 as a parameter. The result is output as the 128-bit extended data 1912 and the fraction data 1913 thereof. The 128-bit extended data are set as the data 1921 of the first section of the N-bit data to be generated. Further, the 128-bit data generated in the $\pi^{-1}$-function processor 1907 is input to an extension unit 1909, and plural copies are generated therefrom. These copies are linked to one another to generate a work key 1924 for decrypting the second 128-bit data $b_2$ 1904 of the data C.

Further, the second 128-bit data $b_2$ 1904 of the data C is subjected to the character-substitution/transposition to be converted to 128-bit data by using a part of the work 1924 as a parameter in the $\pi^{-1}$-function processor 1914, and then further subjected to the character-substitution/transposition to be converted to 128-bit data by using a part of the work key 1924 as a parameter in the $\pi^{-1}$-function processor 1916.

The output result of the $\pi^{-1}$-function processor 1916 is subjected to the extension (character-substitution) processing by using a part of the work key 1924 as a parameter in the extension processor 1917. The result is output as extended data 1918 and fraction data 1919 thereof.

Here, the extended data 1918 is generated so that the total bit length of the extended data 1918 and the fraction data 1913 generated when the data $b_1$ 1903 is subjected to the extension (character-substitution) processing is equal to 128 bits. The data of 128 bits in total which are obtained by linking the extended data 1918 and the fraction data 1913 are set as the data 1922 of the second section of the N-bit data to be generated. Further, the 128-bit data generated in the $\pi^{-1}$-function processor 1914 are input to the extension unit 1915 to generate plural copies thereof. These copies are linked to one another to generate a work key for decrypting the third 128-bit data of the data C.

The above processing is performed on all the 128-bit data $b_1, b_2, \ldots$ constituting the data C to generate the N-bit data.

According to the data decryption device which constitutes the data encryption/decryption system of the fourth embodiment of the present invention is the same as the conventional data decryption device using the public key cipher system of RSA in that the cipher text 1803 is decrypted to plain text 1814 by using the secret key d 1802. However, the data decryption device in the fourth embodiment of the present invention is different from the conventional device in that the character-substitution/transposition is performed by using the $\pi^{-1}$-function processor as described above.

Further, since the extension (character-substitution) processing is carried out in the extension processors 1911, 1917, ..., the plain text 1814 which is decrypted becomes longer in data length than the cipher text which is compressed by the Haffman compression or the like. This embodiment is also different from the conventional device in this point.

Next, a modification of the data encryption device according to the fourth embodiment will be described.

Figure 20:
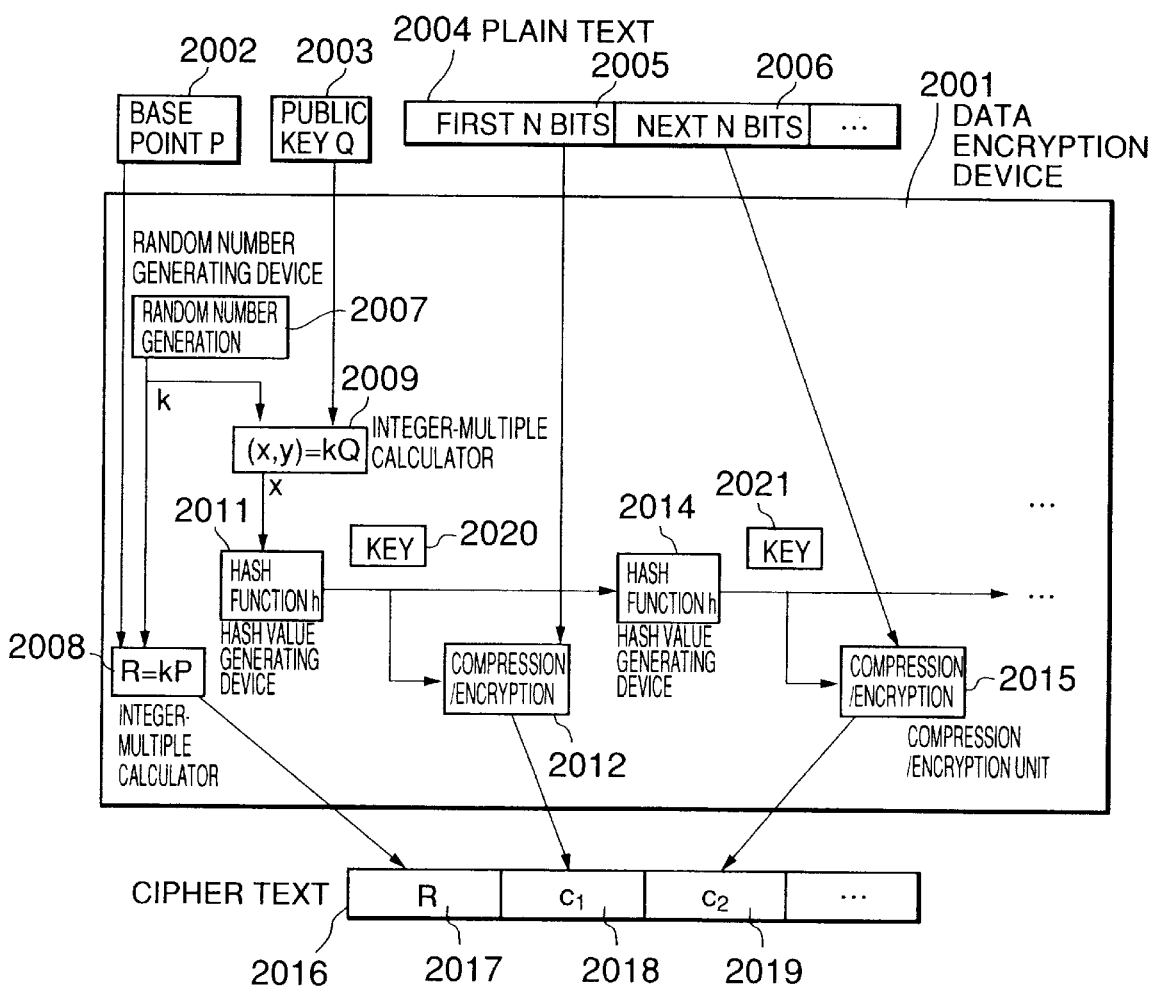
FIG. 20 is a diagram showing the functional constitution of an example of a modification of the data encryption device according to a fourth embodiment of the present invention shown in FIG. 16.

FIG. 20 is a diagram showing the functional constitution of the modification of the data encryption device of the fourth embodiment according to the present invention shown in FIG. 16.

To a data encryption device 2001 shown in FIG. 20 are input a base point P 2002 serving as a parameter in the elliptical curved-line cipher, a public key Q 2003 and a plain text 2004.

The base point P 2002 input to the data encryption device 2001 is input to an integer-multiple calculator 2008 together with a random number k generated in a random number generating device 2007. In response to this, the integer-multiple calculator 2008 carries out the processing indicated by the following equation to generate data R 2017:

$$R=kP$$

The data R 2017 is set as first data of the cipher text 2016.

Further, the public key 0 2003 input to the data encryption device 2001 is input to the integer-multiple calculator 2009 together with the random number k generated in the random number generating device 2007. In response to this, the integer-multiple calculator 2009 carries out the processing indicated by the following equation to generate a point (x,y) on the elliptical curved line:

$$(x,y)=kQ$$

The first N-bit data 2005 of the plain text 2004 input to the data encryption device 2001 is input to a compression/encryption unit 2012. In response to this, the compression/encryption unit 2012 performs the compression/encrypting processing of the first N-bit data 2005 by using as a key 2020 a hash value generated in a hash value generating device 2011, thereby generating data $C_1$ 2018. This data $C_1$ 2018 is set as the second data of the cipher text 2016.

The hash value generating device 2011 generates a hash value for a numerical value x of (x,y) generated in the integer-multiple calculator 2009. This hash value is set as the above key 2020.

The second N-bit data 2006 of the plain text 2004 input to the data encryption device 2001 is input to the compression/encryption unit 2015. In response to this, the compression/encryption unit 2015 performs the compression/encryption processing of the second N-bit data 2006 by using as a key 2021 a hash value generated in a hash value generating device 2014, thereby generating data $C_2$ 2019. This data $C_2$ 2019 is set as the third data of the cipher text 2016.

The above processing is carried out on all the N-bit data constituting the plain text 2004 to generate the cipher text 2016.

In the data encryption device 2001 shown in FIG. 20, the compression/encryption unit 2012, 2015, ... has the same construction as the compression/encryption unit 1612, 1615, ... shown in FIG. 16.

The fourth embodiment of the present invention has been described above.

Next, a fifth embodiment according to the present invention will be described.

As in the case of the fourth embodiment, this embodiment relates to a data encryption/decryption system for electronic mail, etc., and it contains a data encryption device and a data decryption device. Like the hash value generating device of the first embodiment, the data encryption device and the data decrypting device of this embodiment can be implemented by making a microprocessor executing a predetermined program in an information processing device having a microprocessor such as a personal computer, an IC card or the like. Further, it may be implemented by only one LSI.

First, the data encryption device will be described.

Figure 21:
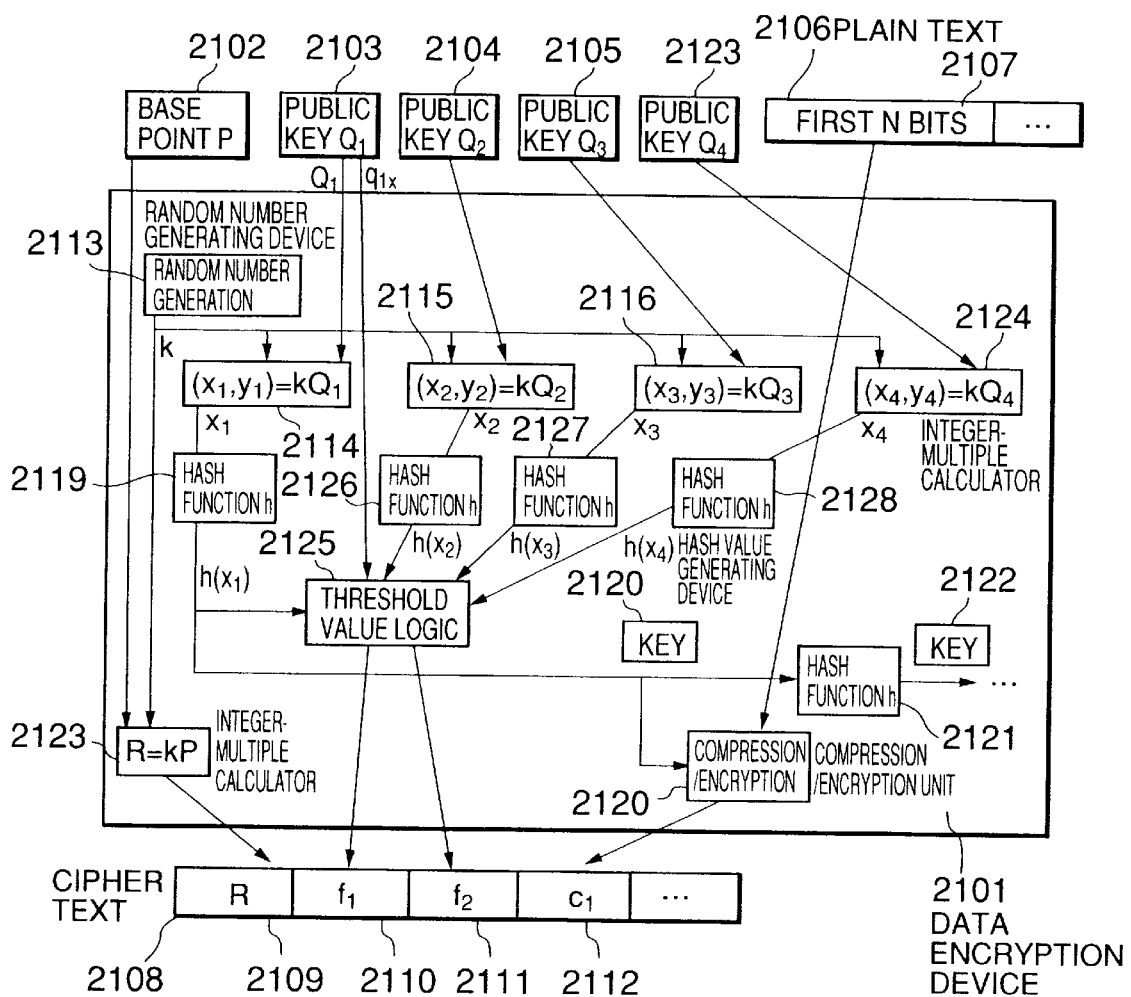
FIG. 21 is a diagram showing the functional constitution of the data encryption device constituting the data encryption/decryption system according to the fifth embodiment of the present invention.

FIG. 21 is a diagram showing the functional constitution of the data encryption device constituting a data encryption/decryption system according to a fifth embodiment of the present invention.

To the data encryption device 2101 shown in FIG. 21 are input a base point P 2102 serving as a parameter in the elliptical curve cipher, a public key $Q_1$ 2103, a public key $Q_2$ 2104, a public key $Q_3$ 2105, a public key $Q_4$ 2123 and plain text 2106.

The base point P 2102 which is input to the data encryption device 2101 is input to an integer-multiple calculator 2123 together with a random number k generated in a random number generating device 2113. In response to this, the integer-multiple calculator 2123 carries out the processing indicated by the following equation to generate data R 2109:

$$R=kP$$

This data R 2109 is set as the first data of the cipher text 2108.

The public key $Q_1$ 2103 input to the data encryption device 2101 is input to an integer-multiple calculator 2114 together with a random number k generated in the random number generating device 2113. In response to this, the integer-multiple calculator 2114 carries out the following processing indicated by the following equation to generate a point $(x_1, y_1)$ on the elliptical curved line:

$$(x_1, y_1)=kQ_1$$

Thereafter, the numerical value xi of $(x_1, y_1)$ is input to the hash value generating device 2119, and converted to a hash value $h(x_1)$.

Likewise, the public key $Q_2$ 2104 input to the data encryption device 2101 is input to an integer-multiple calculator 2115 together with a random number k generated in the random number generating device 2113. In response to this, the integer-multiple calculator 2115 carries out the processing indicated by the following equation to generate a point $(x_2, y_2)$ on the elliptical curved line:

$$(x_2, y_2) = kQ_2$$

Thereafter, the numerical value $x_2$ of $(x_2, y_2)$ is input to a hash value generating device 2126 to be converted to a hash value $h(x_2)$.

Likewise, the public key $Q_3$ 2105 input to the data encryption device 2101 is input to an integer-multiple calculator 2116 together with the random number k generated in the random number generating device 2113. In response to this, the integer-multiple calculator 2116 carries out the processing indicated by the following equation to generate a point $(x_3, y_3)$ on the elliptical curved line:

$$(x_3, y_3) = kQ_3$$

Thereafter, the numerical value $x_3$ of the $(x_3, y_3)$ is input to a hash value generating device 2127 to be converted to a hash value $h(x_3)$.

Further, likewise, the public key $Q_4$ 2123 input to the data encryption device 2101 is input to an integer-multiple calculator 2124 together with the random number k generated in the random number generating device 2113. In response to this, the integer-multiple calculator 2124 carries out the processing indicated by the following equation to generate a point $(x_4, y_4)$ on the elliptical curved line:

$$(x_4, y_4) = kQ_4$$

Thereafter, the numerical value $x_4$ of the $(x_4, y_4)$ is input to a hash value generating device 2128 to be converted to a hash value $h(x_4)$.

A threshold value logic unit 2125 generates values $f_1$ 2110 and $f_2$ 2111 which would satisfy a condition for calculating the hash value $h(x_1)$ generated in the hash value generating device 2119 if any two hash values of the hash values $h(x_2)$, $h(x_3)$, $h(x_4)$ generated in the hash value generating devices 2126, 2127, 2128 are known. These values $f_1$ 2110 and $f_2$ 2111 are set as the second and third data of the encrypted text 2108.

The threshold value logic unit 2125 will be described in detail later.

The first N-bit data 2107 of the plain text 2106 input to the data encryption device 2101 is input to the compression/encryption unit 2120. In response to this, the compression/encryption unit 2120 carries out the compression/encryption processing of the first N-bit data 2107 (which will be described later) by using as a key 2120 the hash value $h(x_1)$ generated in the hash value generating device 2119, thereby generating data $C_1$ 2112. This data $C_1$ 2112 is set as the fourth data of the cipher text 2108. The key 2120 is input to a hash value generating device 2121 to be converted to a key 2122 for encrypting the second N-bit data of the plain text 2106.

The above processing is carried out on all the N-bit data constituting the plain text 2106 to generate the cypher text 2108.

In the data encryption device 2101 shown in FIG. 21, the hash value generating device may be the same as that of the first embodiment, or the conventional "hash function using block encryption" or "special-purpose block function".

Next, the processing in the threshold value logic unit 2125 shown in FIG. 21 will be described.

As described above, the threshold value logic unit 2125 generates values $f_1$, $f_2$ which would satisfy the condition for calculating the hash value $h(x_1)$ if any two hash values of the hash values $h(x_2)$, $h(x_3)$, $h(x_4)$ are known.

Figure 22:
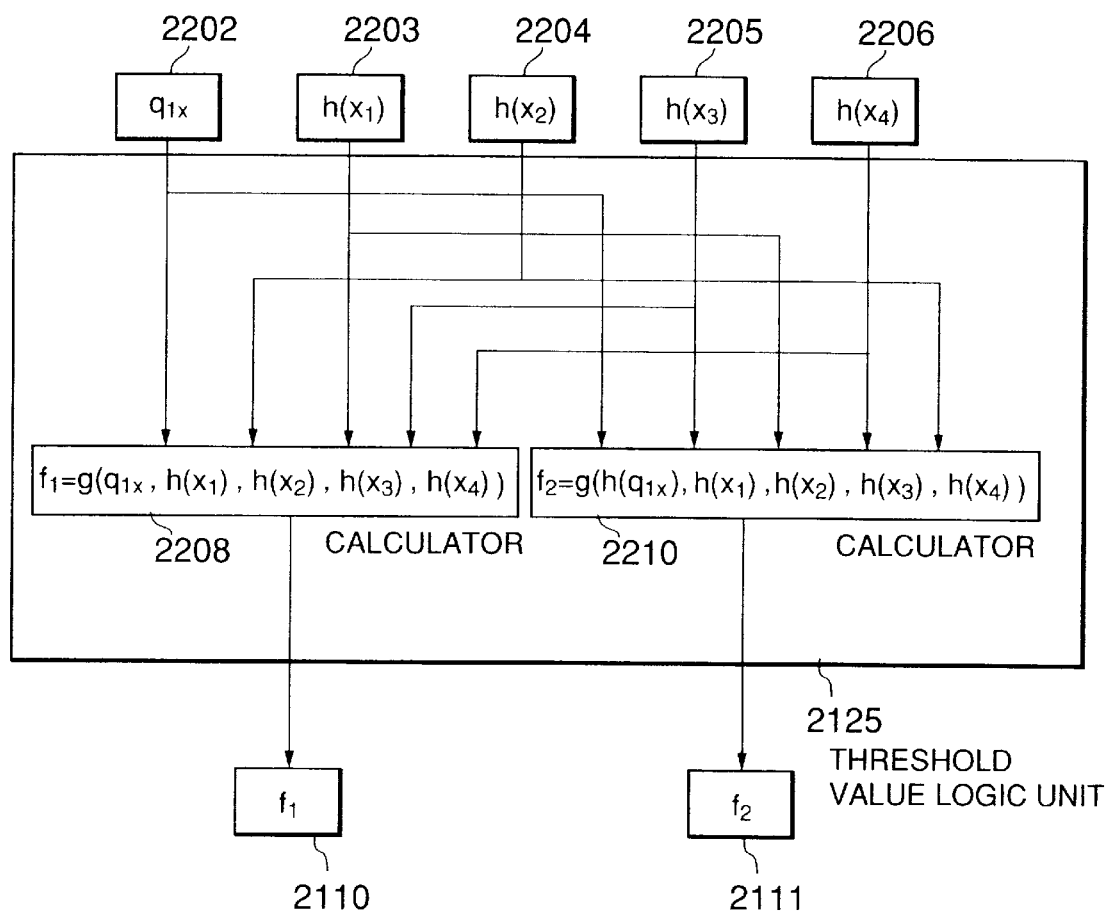
FIG. 22 is a diagram showing the functional constitution of a threshold value logic unit 2125 shown in FIG. 21.

FIG. 22 is a diagram showing the functional constitution of the threshold value logic unit 2125 shown in FIG. 21.

As shown in FIG. 22, five data $q_{1x}$ 2202, $h(x_1)$ 2203, $h(x_2)$ 2204, $h(x_3)$ 2205, $h(x_4)$ 2206 are input to the threshold value logic unit 2125.

Here, $q_{1x}$ 2202 is the x-coordinate value of the public key $Q_1$ 2103 and $h(x_1)$ 2203, $h(x_2)$ 2204, $h(x_3)$ 2205, $h(x_4)$ 2206 are hash values which are generated in the hash value generating devices 2119, 2126, 2127, 2128, respectively.

The calculator 2208 carries out the processing indicated by the following equation to generate data $f_1$ 2110:

$$f_1 = g(q_{1x}, h(x_1), h(x_2), h(x_3), h(x_4))$$

Further, the calculator 2210 carries out the processing indicated by the following equation to generate data $f_2$ 2111:

$$f_2 = g(h(q_{1x}), h(x_1), h(x_2), h(x_3), h(x_4))$$

In $f_1$, $f_2$, the function g is defined as follows:

$$g(x, a_1, a_2, a_3, a_4) = a_1 + a_2 \cdot x + a_3 \cdot x^2 + a_4 \cdot x^3 \pmod{n}$$

Accordingly, the data $f_1$, $f_2$ generated in the calculators 2208 and 2210 respectively satisfy the following four-element simultaneous equations with $q_{1x}$, $h(x_1)$, $h(x_2)$, $h(x_3)$, $h(x_4)$:

$$f_1 = h(x_1) + h(x_2) \cdot q_{1x} + h(x_3) \cdot q_{1x}^2 + h(x_4) \cdot q_{1x}^3 \pmod{n}$$

$$f_2 = h(x_1) + h(x_2) \cdot h(q_{1x}) + h(x_3) \cdot h(q_1)^2 + h(x_4) \cdot h(q_{1x})^3 \pmod{n}$$

Accordingly, when the values of $f_1$, $f_2$, $q_{1x}$ are known, if any two values of $h(x_1)$, $h(x_2)$, $h(x_3)$, $h(x_4)$ are known, the other two values can be deduced (because the number of unknown values is equal to 2 and the number of simultaneous equations is equal to 2).

Next, the processing in the compression/encryption unit 2120, . . . shown in FIG. 21 will be described.

Figure 23:
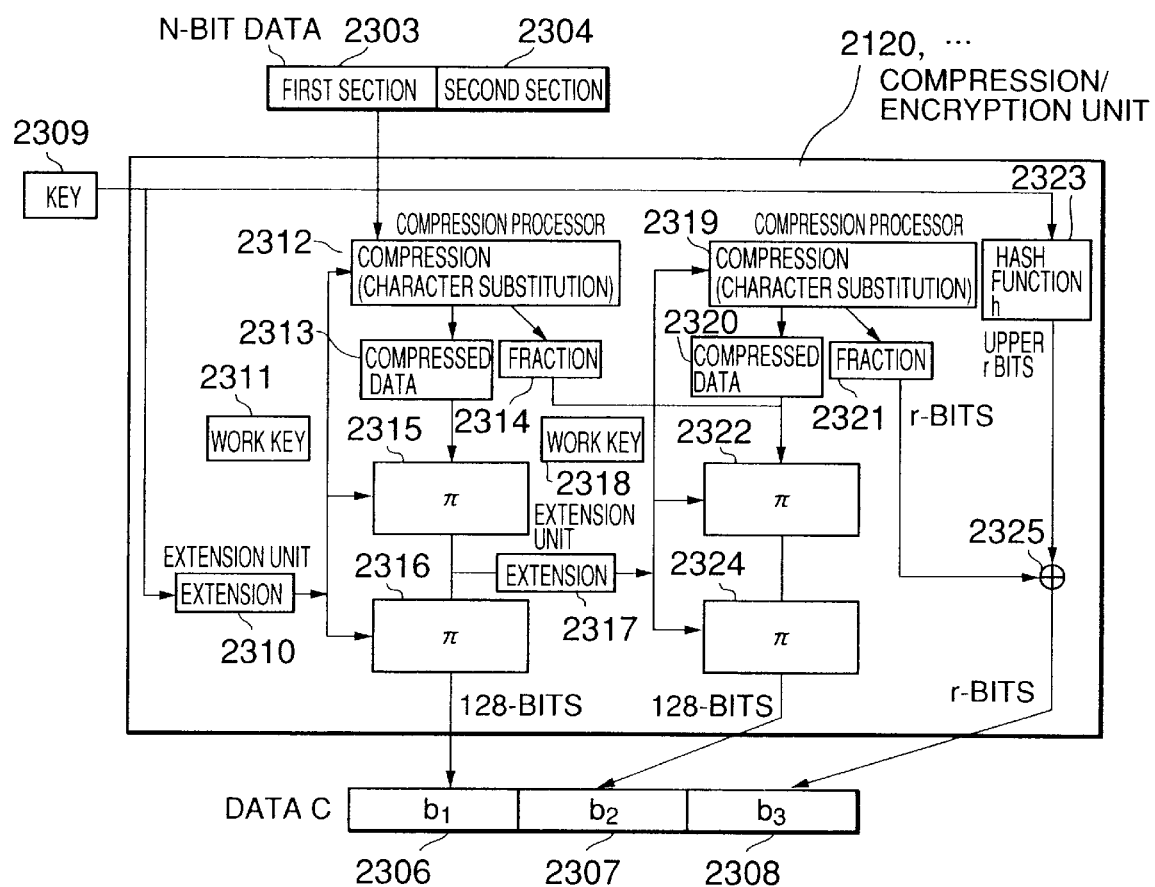
FIG. 23 is a diagram showing the functional constitution of compression/encryption units 2120, . . . shown in FIG. 21.

FIG. 23 is a diagram showing the functional constitution of the compression/encryption unit 2120 shown in FIG. 21.

Here, the N-bit data correspond to the N-bit data 2107, . . . constituting the plain text 2106. Further, the data C represent the data C, 2112, . . . generated by the compression/encryption unit 2120, . . . in FIG. 21. Further, a key 2309 corresponds to the key 2120, 2122, . . . in FIG. 21.

In FIG. 23, when the key 2309 is input, an extension unit 2310 receives the key 2309 to generate plural copies of the key, and link these copes to generate a work key 2311.

Further, a first section 2303 which is the first data section of the N-bit data is subjected to compression (character substitution) processing through the Haffman compression or the like by using a part of the work key 2311 as a parameter in the compression processor 2312. This result is output as 128-bit compressed data and fraction data 2314 thereof.

The 128-bit compressed data 2313 is subjected to block encryption processing by using a part of the work key 2311 as a parameter in a π-function processor 2315 to be converted processor to 128-bit data. Thereafter, in the π-function processor 2316, it is further subjected to the block cipher processing by using a part of the key 2311 as a parameter to be converted to 128-bit data. This data is set as the first data $b_1$ 2306 of the data C to be generated. Further, the 128-bit data to be generated in the π-function processor 2315 is input to an extension unit 2317 to generate plural copies thereof. These copies are linked to one another to generate a work key 2318 for encrypting a second section 2304 which is a second data section of the N-bit data.

The second section 2304 which is the second data section of the N-bit data is subjected to the compression (character-substitution) processing through the Haffman compression or the like by using a part of the work key 2318 as a parameter in the compression processor 2319. The result is output as the compression data 2320 and the fraction data 2321. Here, the compressed data 2320 is generated so that the total bit length of the compressed data 2320 and the fraction data 2314 which are generated in the compression (character substitution) processing of the first section 2303 is equal to 128 bits.

The compressed data 2320 is linked to the fraction data 2314 generated when the first section 2303 is subjected to the compression (character substitution) processing, so that the total bit length thereof is equal to 128 bits. Thereafter, in the π-function processor 2322, the data are subjected to the block cipher processing by using a part of the work key 2318 as a parameter to be converted to 128-bit data. Thereafter, in the π-function processor 2324, the data are further subjected to the block encrypting processing by using a part of the work key 2318 as a parameter to be converted to 128-bit data. This data is set as the second data $b_2$ 2307 of the data C to be generated.

If the fraction data 2321 generated when the second section 2304 is subjected to the compression (character substitution) processing has r bits ($r \geq 1$), the hash value generating device 2323 generates the hash value for the key 2309. In response to this, a calculator 2325 performs an exclusive OR operation between the upper r bits of the hash value generated in the hash value generating device 2323 and the fraction data 2321 to generate data of r bits. This data is set as the third data $b_3$ 2308 of the data C to be generated.

Through the above processing, the encryption data C for the N-bit data are generated.

According to the data encryption device which constitutes the data encryption/decryption system of the fifth embodiment of the present invention, the hash value $h(x_1)$ is used as an initial value to encrypt the plain text 2106. Accordingly, in order to decrypt the cipher text 2108 which is encrypted by the data encryption device, the hash value $h(x_1)$ may be calculated.

In the data encryption device, the threshold value logic unit 2125 generates the values $f_1$, $f_2$ which satisfy the condition under which the hash value $h(x_1)$ can be calculated if any two hash values of the hash values $h(x_2)$, $h(x_3)$, $h(x_4)$ are known, and adds these values $f_1$, $f_2$ to the cipher text 2108.

Therefore, a person who receives the cipher text 2108 (that is, a person who receives $f_1$, $f_2$) can obtain $h(x_1)$ used for the encryption if he/she knows any two of $h(x_2)$, $h(x_3)$, $h(x_4)$ ($q_{1x}$ is further needed in the case shown in FIG. 22).

Accordingly, the decryption of the cipher text 2108 can be performed not only by a person who has the secret key $d_1$ which is paired with the public key $Q_1$ (i.e., a person who can obtain the hash value $h(x_1)$ alone), but also by cooperation between any two persons of a person having the secret key $d_2$ which is paired with the public key $Q_2$ (i.e., a person who can obtain the hash value $h(x_2)$ alone), a person having the secret key $d_3$ which is paired with the public key $Q_3$ (i.e. a person who can obtain the hash value $h(x_3)$ alone) and a person having the secret key $d_4$ which is paired with the public key $Q_4$ (i.e. a person who can obtain the hash value $h(x_4)$ alone).

The former equates to 1-out-of-1 decryption logic, and the latter equates to 2-out-of-3 decoding logic. According to this embodiment, the threshold value control for the number of receivers who can decrypt the cipher text can be performed.

That is, by multi-casting the cipher text 2108 to each of the owners of the secret keys $d_1$, $d_2$, $d_3$, $d_4$, the owner having the secret key $d_1$ can decrypt the cipher text 2108 alone, and also any two of the other three owners having the secret keys $d_2$, $d_3$, $d_4$ can decrypt the cipher text 2108 if the owners cooperate with each other.

Next, a modification of the data encryption device shown in FIG. 21 will be described.

Figure 25:
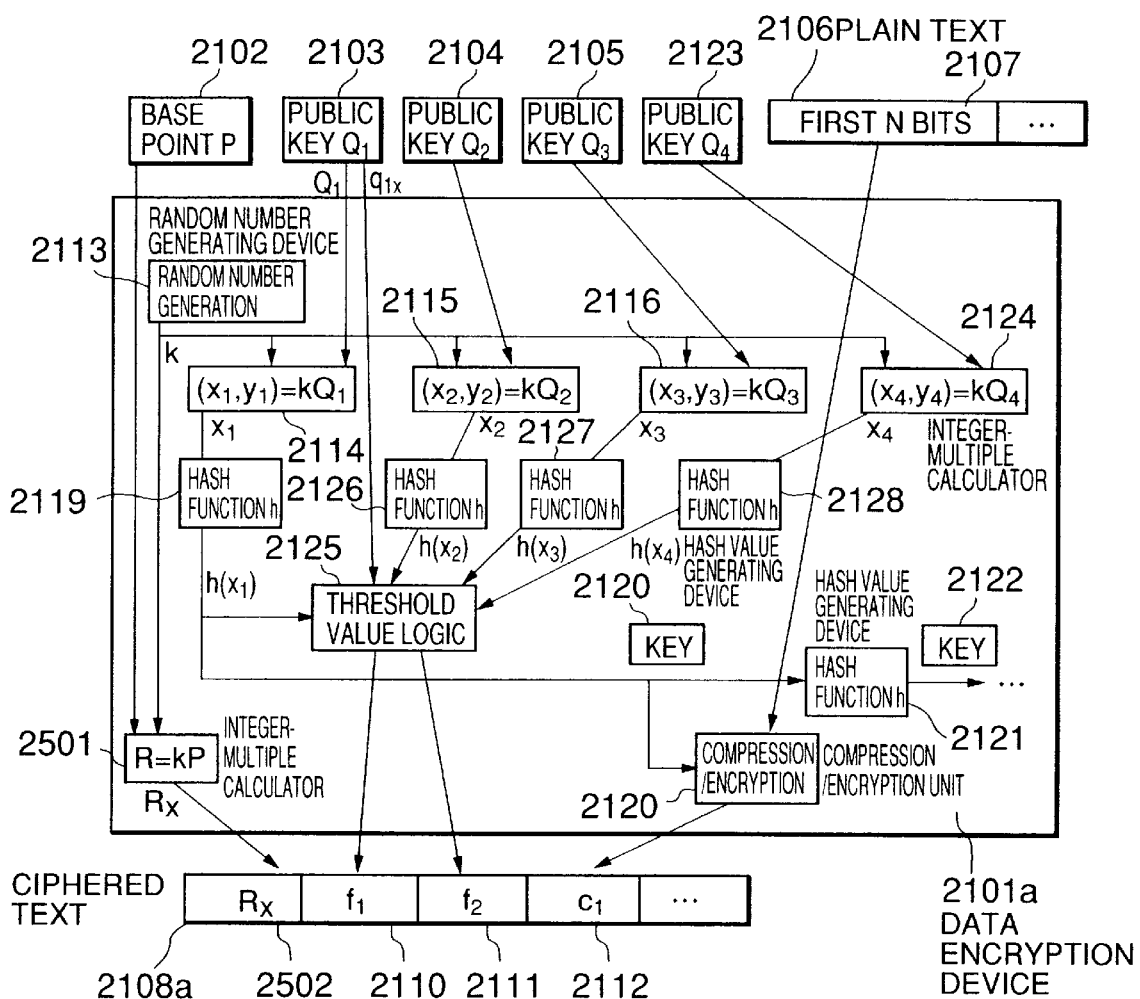
FIG. 25 is a diagram showing the functional constitution of an example of a modification of the data encryption device constituting the fifth embodiment of the present invention.

FIG. 25 is a diagram showing the functional constitution of an example of the modification of the data encryption device shown in FIG. 21. Here, the elements having the same functions as those of the data encryption device 2101 of FIG. 21 are represented by the same reference numerals.

A data encryption device 2101 a shown in FIG. 25 is different from the data encryption device 2101 shown in FIG. 21 in that an integer-multiple calculator 2501 is used in place of the integer-multiple calculator 2123. The remainder of the construction is the same as shown in FIG. 21.

The integer-multiple calculator 2501 is the same as the integer-multiple calculator 2123 shown in FIG. 21 in that it receives the base point P 2102 and the random number k generated in the random number generating device 2113 to carry out the processing indicated by R=kP. However, it is different in that only the value $R_x$ 2502 of R calculated from the above equation is output.

Accordingly, in the data encryption device 2101 a shown in FIG. 25, the data $R_x$ 2502 is set as the first data of the encrypted sentence 2108a.

In the data encryption device 2101 a shown in FIG. 25, the cipher text to be generated is shorter than the cipher text generated in the data encryption device 2101 shown in FIG. 21.

That is, according to the data encryption device 2101 shown in FIG. 21, in the integer-multiple calculator 2123, the point R=kP on the elliptical curved line is calculated, and the x-coordinate value $R_x$ and the y-coordinate value $R_y$ of R thus calculated are output and set as the first data R 2109 of the cipher text 2108.

On the other hand, according to the data encryption device 2101 a shown in FIG. 25, in the integer-multiple calculator 2501, the point R=kP on the elliptical curved line is calculated, and only the x-coordinate value of R thus calculated is output and set as the first data $R_x$ 2502 of the cipher text 2108a.

Accordingly, the cipher text 2108a generated by the data encryption device 2101a shown in FIG. 25 is shorter than the cipher text 2108 generated by the data encryption device 2101 shown in FIG. 21 by the amount corresponding to the data of the y-coordinate value $R_y$ (for example, 160 bits).

Next, the data decryption device will be described.

Figure 26:
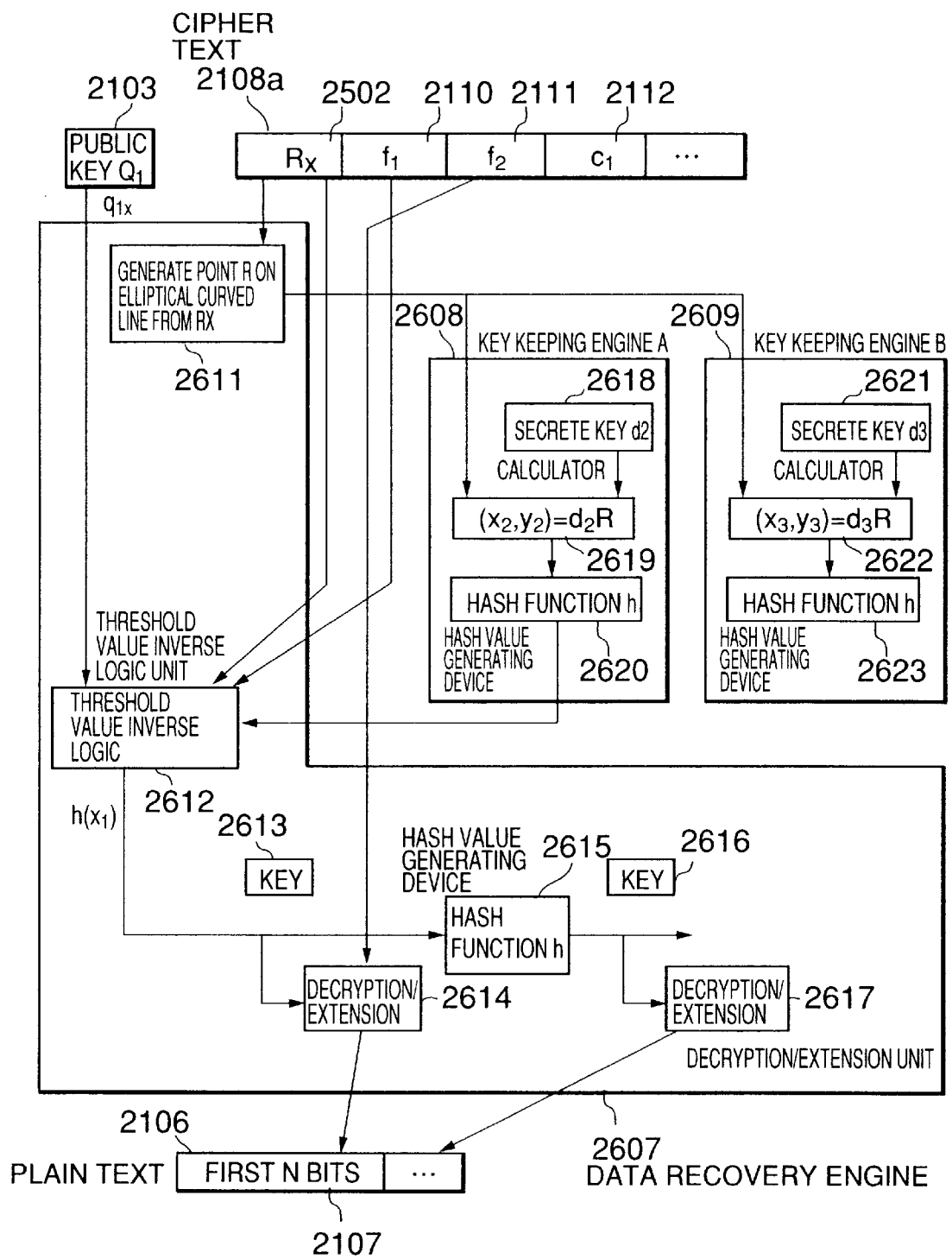
FIG. 26 is a diagram showing the functional constitution of the data decryption device constituting the data encryption/decryption system according to the fifth embodiment of the present invention.

FIG. 26 is a diagram showing the functional constitution of the data decryption device constituting the data encryption/decryption system according to the fifth embodiment of the present invention. The data decryption device is used to decrypt the cipher text 2108a generated by the data encryption device 2101 a shown in FIG. 25.

As shown in FIG. 26, the data decryption device comprises a data recovery engine 2607, a key keeping engine A 2608 and a key keeping engine B 2609.

When the public key $Q_1$ 2103 and the cipher text 2108a are input to the data recovery engine 2607 shown in FIG. 26, a calculator 2611 determines a y-coordinate value $R_y$ which satisfies the following elliptical curve equation with the first data $R_x$ 2502 of the cipher text 2108a:

$$R_y^2 = R_x^3 + a \cdot R_x + b$$

Usually, two resolutions $R_y$ exist for this equation. Assuming that one resolution is represented by r, the other resolution is represented by −r (when the equation: $y^2+xy=x^3+ax+b$ is used as an elliptical curved line, representing one resolution by r, the other resolution is represented by $R_x+r$).

Any one of the resolutions is taken, and the other resolution is ignored. In this case, it is assumed that r is taken. The calculator 2611 outputs $R=(R_x, r)$.

Subsequently, the data recovery engine 2607 transmits the value R output from the calculator 2611 to each of the key keeping engines A 2608 and B 2609.

In response to this, the key keeping engine A 2608 successively carries out the following processing:
(1) Reading out the secret key $d_2$ 2618 (paired with the public key $Q_2$ 2104) stored in the key keeping engine A 2608 itself.
(2) Calculating the point $(x_2, y_2)$ on the elliptical curved line which satisfies the following equation with the value R transmitted from the data recovery engine 2607 in a calculator 1619.

$$(x_2, y_2)=d_2R$$

(1) Generating the hash value $h(x_2)$ of the x-coordinate value $x_2$ of $(x_2, y_2)$ calculated in the calculator 2619 in the hash value generating device 2620.
(4) Transmitting the hash value $h(x_2)$ generated in the hash value generating device 2620 to the data recovery engine 2607.

Further, the key keeping engine B 2609 successively carries out the following processing:
(1) Reading out the secret key $d_2$ 2621 (paired with the public key $Q_3$ 2105) stored in the key keeping engine B 2609 itself.
(2) Calculating the point $(x_3, y_3)$ on the elliptical curved line satisfying the following equation with the value R transmitted from the data recovering engine 2607 in the calculator 2622:

$$(x_3, y_3)=d_3R$$

(3) Generating the hash value $h(x_3)$ of the x-coordinate value X3 of $(x_3, y_3)$ calculated in the calculator 2622 in the hash value generating device 2623.
(4) Transmitting the hash value $h(x_3)$ generated in the hash value generating device 2623.

The hash values $h(x_2)$, $h(x_3)$ obtained through the above processing have the following feature.

It is assumed that the data transmitted to each of the key keeping engines A 2608 and B 2609 is not $R=(R_{x,r})$, but $R'=(R_x^{-1}-r)$. In this case, the calculation of $(x_2', y_2')=d_2R'$ is performed in the calculator 2919 of the key keeping engine A 2608. However, $(x_2', y_2')=(x_2, -y_2)$ due to the property of the calculation on the elliptical curved line. That is, in the calculation using the elliptical curved line $y^2=x^3+ax+b$, the equation: $-(x,y)=(x, -y)$ is satisfied. At this time, if $(x_2, y_2)=d_2(R_x, r)$, $d_2(R_x, -r)=d_2(-(R_x, r))=-d_2(R_x, r)=(x_2, -y_2)$ Further, in the calculation using the elliptical curved line: $y^2+xy=x^3+ax+b$, the equation: $-(x,y)=(x, x+y)$ is satisfied. At this time, if $(x_2, y_2)=d_2(R_x, r)$, $d_2(R_x, R_x+r)=d_2(-(R_x, r))=-d_2(R_x, r)=(x_2, x_2+y_2)$ Accordingly, $h(x_2')=h(x_2)$.

That is, even if $R=(R_x, r)$ is input or $R'=(R_x, -r)$ is input, the hash value $h(x_2)$ output from the key keeping engine A 2608 is not varied.

Likewise, even if $R=(R_x, r)$ is input or $R'=(R_x, -r)$ is input, the hash value $h(x_3)$ output from the key keeping engine B 2609 is not varied.

This is the reason why irrespective of the existence of two resolutions $R_y$ of the equation in the calculator 2611 of the data restoring engine 2607, any one of the resolutions is transmitted to the key keeping engine A 2608 and the key keeping engine B 2609.

Subsequently, when receiving the respective hash values $h(x_2)$ and $h(x_3)$ from the key keeping engine A 2608 and the key keeping engine B 2609, the data recovery engine 2607 starts the processing by a threshold value inverse operation logic unit 2612.

The threshold value inverse operation logic unit 2612 first receives the hash values $h(x_2)$ and $h(x_3)$, the x-coordinate value $q_{1x}$ of the public key $Q_1$ 2103 and the second and third data $f_1$ 2110, $f_2$ 2111 of the cipher text 2108*a*. Thereafter, it generates $h(x_1)$, $h(x_4)$ which satisfy the following two-element simultaneous equations:

$$f_1=h(x_1)+h(x_2)\cdot q_{1x}+h(x_3)\cdot q_{1x}^2+h(x_4)\cdot q_{1x}^3 (\text{mod } n)$$

$$f_2=h(x_1)+h(x_2)\cdot h(q_{1x})+h(x_3)\cdot h(q_{1x})^2+h(x_4)\cdot h(q_{1x})^3 (\text{mod } n)$$

Here, the above two-element simultaneous equations correspond to the case where $h(x_2)$ and $h(x_3)$ are known in the four-element simultaneous equations in which the hash values $h(x_1)$, $h(x_2)$, $h(x_3)$, $h(x_4)$ generated in the hash value generating devices shown in FIGS. 21 and 25 are unknown.

In the hash value generating devices shown in FIGS. 21 and 25, $(x_2, y_2)=kQ_2$ is calculated by using the random number k generated in the random number generating device, and the hash value for the x-coordinate numerical value $x_2$ thereof is set as $h(x_2)$. Likewise, $(x_3, y_3)=kQ_3$ is calculated by using the random number k, and the hash value for the x-coordinate numerical value $x_3$ thereof is set as $h(x_3)$.

On the other hand, in the hash value generating device shown in FIG. 26, $d_2R$ (or $d_2R'$) is calculated by using R which is calculated from $R=kP$ by using the same random number k as described above (or by using R' which is different from R in only the sign of the y-coordinate), and the hash value for the x-coordinate numerical value $x_2$ (or $x_2'$) is set as $h(x_2)$. Likewise, $d_3R$ (or $d_3R'$) is calculated and the hash value for the x-coordinate numerical value $x_3$ (or $X_3'$) is set as $h(x_3)$.

Here, from the relationship of the secret key and the public key in the elliptical curve ciphering, it is established that $Q_2=d_2P$, $Q_3=d_3P$. Accordingly, the following equations is satisfied:

$$d_2R=d_2kP=kd_2P=kQ_2=(x_2, y_2)$$

$$d_3R=d_3kP=kd_3P=kQ_3=(x_3, y_3)$$

For the reason described above, the X-coordinate values of $d_2R$, $d_3R$ are equal to $x_2$, $x_3$.

Accordingly, each of the hash values $h(x_2)$, $h(x_3)$ generated in the hash value generating device shown in FIG. 26 is coincident with each of the hash values $h(x_2)$, $h(x_3)$ generated in the hash value generating device shown in FIGS. 21 and 25, so that each of the hash values $h(x_1)$, $h(x_4)$ obtained in the threshold value inverse operation logic unit 2612 is coincident with each of the hash values $h(x_1)$, $h(x_4)$ generated in the hash value generating device shown in FIGS. 21 and 25.

The decryption/extension unit 2614 performs the decryption/extension processing on the fourth data $C_1$ 2112 of the cipher text 2108*a* by using the hash value $h(x_1)$ obtained in the threshold value inverse block unit 2612 as a key 2613, thereby generating the first N-bit data 2107 of the plain text 2106.

The decryption/extension 2617 performs the decryption/extension processing on the fifth data of the cipher text 2108a by using as a key 2616 the hash value generated on the basis of the key 2613, in the hash value generating device 2615, thereby generating the second N-bit data of the plain text 2106.

The above processing is successively repeated until it is carried out on the final data constituting the cipher text 2108a, thereby recovering the plain text 2106.

In the fifth embodiment of the present invention, if $f_1$, $f_2$, ..., $f_n$ are contained in the cipher text, the multicasting may be performed for n persons so that some of the n persons are allowed to decrypt the cipher text alone and the other persons are allowed to decrypt the cipher text when at least two persons thereof cooperate with each other. Alternatively, each of the n persons may be able to decrypt the cipher text alone.

Figure 24:
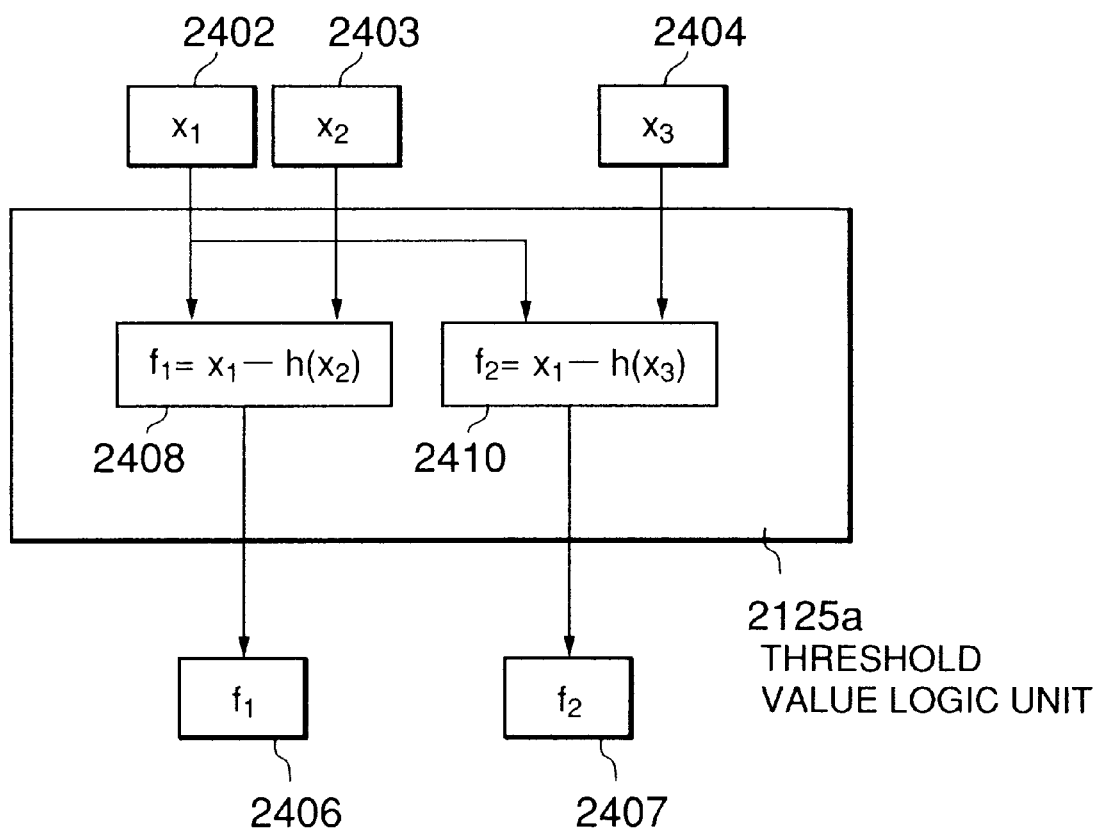
FIG. 24 is a diagram showing the functional constitution of an example of a modification of the threshold logic of the data encryption device constituting the fifth embodiment of the present invention.

FIG. 24 is a diagram showing the function construction of a modification of the threshold value logic unit of the data encryption device according to the fifth embodiment of the present invention.

As shown in FIG. 24, three data $x_1$ 2402, $x_2$ 2403 and $x_3$ 2404 are input to the threshold value logic unit 2125a.

Here, $x_1$ 2402, $x_2$ 2403 and $x_3$ 2404 represent x-coordinate values which are generated in the integer-multiple calculators 2114, 2115, 2116 shown in FIG. 21, respectively.

A calculator 2408 carries out the processing indicated by the following equation to generate data $f_1$ 2406:

$$f_1 = x_1 - h(x_2)$$

Here, $h(x_2)$ represents the hash value generated in the hash value generating device 2126 shown in FIG. 21. Further, a calculator 2410 carries out the processing indicated by the following equation to generate data $f_2$ 2407:

$$f_2 = x_1 - h(x_3)$$

Here, $h(x_3)$ represents the hash value generated in the hash value generating device 2127 shown in FIG. 21.

By using the threshold value logic unit 2125a shown in FIG. 24, the data encryption device 2101 shown in FIG. 21 generates the data $f_1$ 2406 on the basis of the random number k generated during the encryption processing and the public key $Q_2$ 2104. Therefore, any person having the secret key $d_2$ which is paired with the public key $Q_2$ 2104 can decrypt the cipher text 2108 alone.

Likewise, the data $f_2$ 2407 is generated on the basis of the random number k generated in the encryption processing and the public key $Q_3$ 2105. Therefore, any person having the secret key $d_3$ which is paired with the public key $Q_3$ 2105 can decrypt the cipher text 2108 alone.

That is, the cipher text 2108 is multicasted to persons who have the secret keys $d_1$, $d_2$, $d_3$, whereby each of the persons is allowed to decrypt the cipher text alone. Further, in order to increment the number of communication targets by one, it is sufficient to add the data amount corresponding to the length of the hash value (for example, 80 bits), so that the multicasting communication can be performed efficiently. In this case, only a one-way property is required for the hash function, and no collision free property is required.

In the above embodiment, the elliptical curve cipher based on the equation: $y^2 = x^3 + ax + b$ is used. In place of this equation, the elliptical curve ciphering based on the equation: $y^2 + xy = x^3 + ax + b$ may be used.

As described above, according to the present invention, the hash values having a high degree of data scrambling can be generated rapidly.

Further, data such as keys and cipher text which have a high degree of data scrambling can be generated rapidly.

Further, when the same data are transmitted to plural destinations while encrypted, it is unnecessary to encrypt the data by using, for every destination, a public key which is distributed from each destination in advance.

Further, even when a receiver loses a secret key because he/she carelessly erases it from his/her file or the like, he/she can decrypt the received cipher text in cooperation with other two or more persons.

What is claimed is:

1. A hash value generating method which is used for digital signature or data encryption comprising:

a first step for dividing target data into at least two blocks;

a second step for performing character-substitution and/or transposition processing on any one of the at least two blocks obtained in said first step;

a third step for performing multiplication on the data obtained in said second step so that the data length of the multiplication result is longer than the data length of the data concerned;

a fourth step for further dividing the data obtained in said third step into at least two blocks; and a fifth step for performing character-substitution and/or transposition processing on each of the at least two blocks obtained in said fourth step.

2. A hash value generating method which is used for digital signature or data encryption comprising:

a first step for dividing target data into at least two blocks; and a second step for subjecting at least one of the at least two blocks obtained in said first step to injection extension transformation in which an output value is absolutely different if an input value is different (injection) and the length of the output value is longer than the length of the input value (extension).

3. The hash value generating method as claimed in claim 2, wherein in said injection extension transformation, data other than the data serving as a target of the injection extension transformation of the at least two blocks obtained in said first step is used as a parameter.

4. The hash value generating method as claimed in claim 2, wherein in said injection extension transformation, an initial value which is set separately from the at least two blocks obtained in said first step is used as a parameter.

5. The hash value generating method as claimed in claim 2, wherein said second step performs the injection extension transformation on at least any two of the at least two blocks obtained in said first step, and wherein the injection extension transformation which is performed on one of the at least two uses as a parameter an initial value which is set separately from the at least two blocks obtained in said first step, and the injection extension transformation which is performed on the other uses as a parameter the result of the injection extension transformation using the initial value as a parameter.

6. The hash value generating method as claimed in claim 2, wherein said second step performs the injection extension transformation on at least any two of the at least two blocks obtained in said first step, one of the at least two being subjected to the injection extension transformation twice, and the injection extension transformation which is performed on the one of the at least two twice uses as a parameter the result of the injection extension transformation which is performed on the other.

7. The hash value generating method as claimed in claim 2, wherein said injection extension transformation contains a third step for performing character-substitution and/or transposition processing on an input value, and a fourth step for performing multiplication on the input value obtained in said third step so that the multiplication result is longer than the data length of the data concerned.

8. The hash value generating method as claimed in claim 2, wherein said injection extension transformation contains a third step for performing character-substitution and/or transposition processing on an input value, and a fourth step for performing a cyclic shift calculation on the input value obtained in said third step.

9. A data encryption method for encrypting target data and outputting encrypted data having a fixed length, comprising:

a first step for subjecting target data to character-substitution and/or transposition processing;

a second step for subjecting data obtained in said first step to such multiplication processing that the multiplication result is longer than the data length of the data concerned;

a third step for dividing the data obtained in said second step into at least two blocks; and a fourth step for performing character-substitution and/or transposition processing on each of the at least two blocks obtained in said third step.

10. A data encryption method for encrypting data and outputting encrypted data, comprising processing for successively performing encryption processing on all portions constituting target data, the encryption processing containing a first step for compressing a part of the target data, a second step for subjecting data obtained in said first step to such injection transformation that if an input value is varied, an output value is varied, and a third step for outputting the data obtained in said second step as a part of encrypted data, wherein said first step compresses a first part of the target data by using as a parameter data obtained by converting a key, and compresses a second and subsequent parts constituting the target data by using as a parameter the result of said second step which is carried out in the encryption processing just before, and said second step performs multiplication two or more times in the process of the injection transformation.

11. A hash value generating device for generating a hash value which is difficult to inversely convert to original data, comprising:

first dividing means for dividing target data into at least two blocks;

first character-substitution/transposition processing means for performing character-substitution and/or transposition processing on any one of the at least two blocks obtained by said first dividing means;

multiplication means for performing multiplication on the data converted by said first character-substitution/ transposition processing means so that the length of the multiplication result is longer than the data length of the data concerned;

second dividing means for further dividing the data multiplied by said multiplication means into at least two blocks; and second character-substitution/transposition processing means for performing character-substitution and/or transposition processing on each of the at least two blocks obtained by said second diving means.

12. A hash value generating device for generating a hash value which is difficult to inversely convert to original data, comprising:

first dividing means for dividing target data into at least two parts; and injection extension means for performing injection extension transformation so that if an input value is varied, an output value is absolutely varied (injection) and the length of the output value is longer than the length of the input value (extension).

13. A data encryption device for encrypting data having fixed length and outputting encrypted data having fixed data, comprising:

first character-substitution/transposition processing means for performing character-substitution and/or transposition processing on target data;

multiplication means for performing multiplication on the data converted by said first character-substitution/ transposition conversion so that the length of the result is longer than the data length of the data concerned;

dividing means for dividing the data multiplied by said multiplication means into at least two blocks; and second character-substitution/transposition processing for performing character-substitution and/or transposition processing on each of the at least two blocks obtained by said dividing means.

14. A data encryption device for encrypting data and outputting encrypted data, comprising:

encryption means which contains compression means for compressing a part of target data, injection transformation means for subjecting the data compressed in said compression means to injection transformation in which if an input value is different, an output value is completely different, and output means for outputting the data converted by said injection transformation means as a part of encrypted data; and means for successively inputting all portions constituting the target data into said encryption means, wherein said compression means compresses the first part of the target data by using as a parameter data obtained by converting a key, and compresses second and subsequent parts of the target data by using as a parameter a injection transformation result which is obtained on immediately preceding input data by said injection transformation means, and said injection transformation means carries out multiplication two or more times in the process of the injection transformation.

* * * * *